US012587998B2

(12) United States Patent
Zhou et al.

(10) Patent No.: US 12,587,998 B2
(45) Date of Patent: Mar. 24, 2026

(54) METHOD AND DEVICE FOR PATTERN DESIGN FOR SIDELINK POSITIONING REFERENCE SIGNALS

(71) Applicant: Samsung Electronics Co., Ltd., Gyeonggi-do (KR)

(72) Inventors: Yuhan Zhou, San Diego, CA (US); Philippe Jean Marc Michel Sartori, Naperville, IL (US); Yaser Mohamed Mostafa Kamal Fouad, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 285 days.

(21) Appl. No.: 18/489,294

(22) Filed: Oct. 18, 2023

(65) Prior Publication Data

US 2024/0147416 A1 May 2, 2024

Related U.S. Application Data

(60) Provisional application No. 63/420,263, filed on Oct. 28, 2022.

(51) Int. Cl.
H04W 72/25 (2023.01)
H04L 5/00 (2006.01)
(Continued)

(52) U.S. Cl.
CPC .......... H04W 68/00 (2013.01); H04L 5/0051 (2013.01); H04W 72/25 (2023.01); H04W 72/542 (2023.01)

(58) Field of Classification Search
CPC ... H04W 68/00; H04W 72/25; H04W 72/542; H04W 72/02; H04W 72/40; H04W 92/18;
(Continued)

(56) References Cited

U.S. PATENT DOCUMENTS

2022/0271888 A1   8/2022   Cha et al.
2022/0416976 A1   12/2022   Baek et al.
(Continued)

FOREIGN PATENT DOCUMENTS

EP          3 955 491        2/2022
WO      WO 2024/030636      2/2024

OTHER PUBLICATIONS

Samsung, "Discussion on Potential Solutions for SL Positioning", R1-2209736, 3GPP TSG RAN WG1 #110bis-e, Oct. 10-19, 2022, 11 pages.
(Continued)

*Primary Examiner* — Thai Nguyen
(74) *Attorney, Agent, or Firm* — The Farrell Law Firm, P.C.

(57) ABSTRACT

A method and a device are provided in which a user equipment (UE) allocates, in a dedicated resource pool for transmitting a sidelink (SL)-positioning reference signal (PRS), a first resource in a slot for SL-PRS symbols, allocates, in the dedicated resource pool, a second resource in a control region of the slot for physical SL control channel (PSCCH) symbols, measures, in the dedicated resource pool, a channel busy ratio (CBR) based on resource elements of at least one of the SL-PRS symbols or the PSCCH symbols, and determine transmission parameters for the SL-PRS based on at least the CBR.

20 Claims, 29 Drawing Sheets

(51) Int. Cl.
    *H04W 68/00*        (2009.01)
    *H04W 72/542*     (2023.01)

(58) Field of Classification Search
    CPC ....... H04W 64/00; H04W 24/08; H04W 8/24;
              H04L 5/0051; H04L 1/189; H04L 1/1854;
                  H04L 1/1861; H04L 5/0055; H04L
                  2001/0093; H04L 5/0048; H04L 5/006;
                  H04L 5/0064; H04L 1/0009
    See application file for complete search history.

(56)              References Cited

U.S. PATENT DOCUMENTS

| | | | |
|---|---|---|---|
| 2023/0048608 A1* | 2/2023 | Ren | H04L 5/0053 |
| 2023/0050447 A1 | 2/2023 | Ren et al. | |
| 2023/0052126 A1 | 2/2023 | Nam et al. | |
| 2024/0340925 A1* | 10/2024 | Lou | G01S 5/0205 |

OTHER PUBLICATIONS

European Search Report dated Apr. 10, 2024 issued in counterpart application No. 23205727.3-1206, 9 pages.
EP Communication Report dated Mar. 12, 2025 issued in counterpart application No. 23205727.3-1206, 10 pages.
3GPP TS 38.133 V17.7.0 (Sep. 2022), pp. 5201.
3GPP TS 37.355 V17.2.0 (Sep. 2022), pp. 346.
3GPP TS 22.261 V19.0.0 (Sep. 2022), pp. 114.
3GPP TS 22.186 V17.0.0 (Mar. 2022), pp. 18.
5GAA, "LS reply to 3GPP RAN on requirements of in-coverage, partial coverage, and out-ofcoverage positioning use cases".
3GPP TSG RAN Meeting #91e RP-210040 Electronic Meeting, Mar. 16-26, 2021, pp. 5.
3GPP TS 38.214 V17.3.0 (Sep. 2022), pp. 232.
Intel, "Revised SID on Study on expanded and improved NR positioning", 3GPP TSG RAN Meeting #94e RP-213588 Electronic Meeting, Dec. 6-17, 2021, pp. 6.
3GPP TS 38.212 V17.3.0 (Sep. 2022), pp. 201.
Vivo, "Discussion on potential solutions for sidelink positioning", 3GPP TSG RAN WG1 #109-e R1- 2203566 e-Meeting, May 9-20, 2022, pp. 12.

* cited by examiner

Comb-4

Comb-12

Comb-2

Comb-6

PRS Resource 202

METHOD AND DEVICE FOR PATTERN DESIGN FOR SIDELINK POSITIONING REFERENCE SIGNALS

CROSS-REFERENCE TO RELATED APPLICATION

This application claims the priority benefit under 35 U.S.C. § 119(e) of U.S. Provisional Application No. 63/420, 263, filed on Oct. 28, 2022, the disclosure of which is incorporated by reference in its entirety as if fully set forth herein.

TECHNICAL FIELD

The disclosure generally relates to sidelink (SL) communication. More particularly, the subject matter disclosed herein relates to improvements to positioning reference signal (PRS) transmission on the SL.

SUMMARY

In 3$^{rd}$ Generation Partnership Project (3GPP) release (Rel)-16/17, both positioning and SL communication were standardized. However, SL positioning was not considered. The scope of 3GPP Rel-18 has been defined to include standardization of SL positioning.

To enable the realization of SL positioning, a slot structure to be used for transmitting SL-PRSs needs to be defined.

To overcome these issues, systems and methods are described herein for time and frequency resource allocation for PRS transmissions when a dedicated resource pool is configured.

The above approaches improve on previous methods because they can support the feature of SL positioning to achieve required accuracy.

In an embodiment, a method is provided in which a user equipment (UE) allocates, in a dedicated resource pool for transmitting an SL-PRS, a first resource in a slot for SL-PRS symbols, allocates, in the dedicated resource pool, a second resource in a control region of the slot for physical SL control channel (PSCCH) symbols, measures, in the dedicated resource pool, a channel busy ratio (CBR) based on resource elements of at least one of the SL-PRS symbols or the PSCCH symbols, and determines transmission parameters for the SL-PRS based on at least the CBR.

In an embodiment, a UE is provided that includes a processor and a non-transitory computer readable storage medium storing instructions. When executed, the instructions cause the processor to allocate, in a dedicated resource pool for transmitting an SL-PRS, a first resource in slot for SL-PRS symbols, allocate, in the dedicated resource pool, a second resource in a control region of the slot for PSCCH symbols, measure, in the dedicated resource pool, a CBR based on resource elements of at least one of the SL-PRS symbols or the PSCCH symbols, and determine transmission parameters for the SL-PRS based on at least the CBR.

BRIEF DESCRIPTION OF THE DRAWING

In the following section, the aspects of the subject matter disclosed herein will be described with reference to exemplary embodiments illustrated in the figures, in which.

3                                          4

Figure 26:
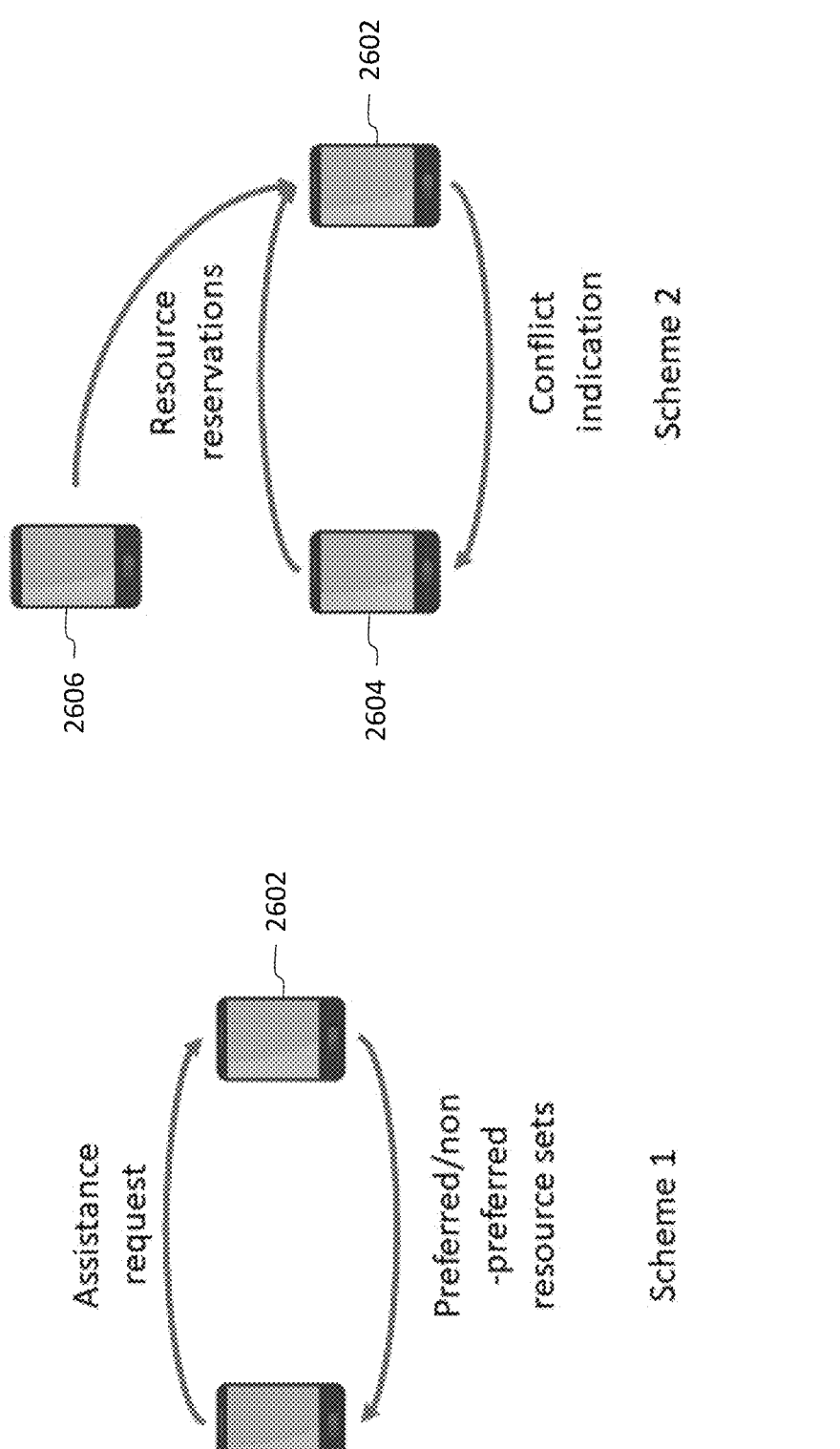
Figure 27:
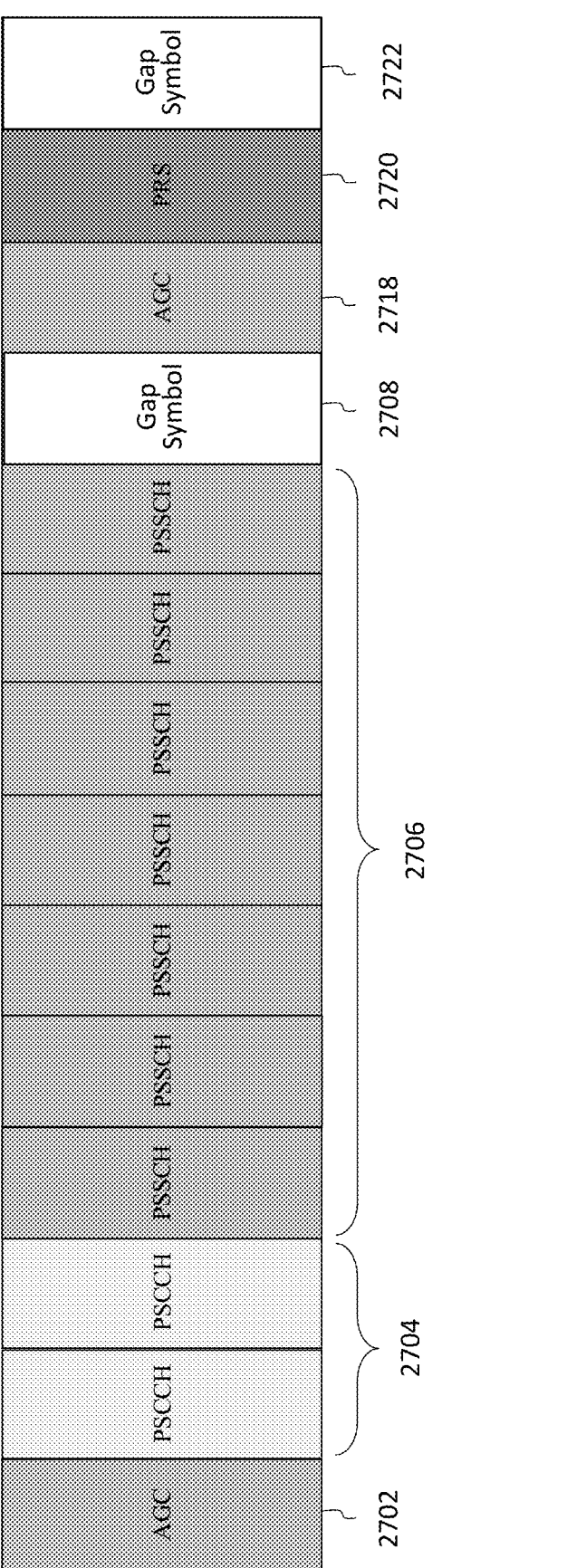
Figure 28:
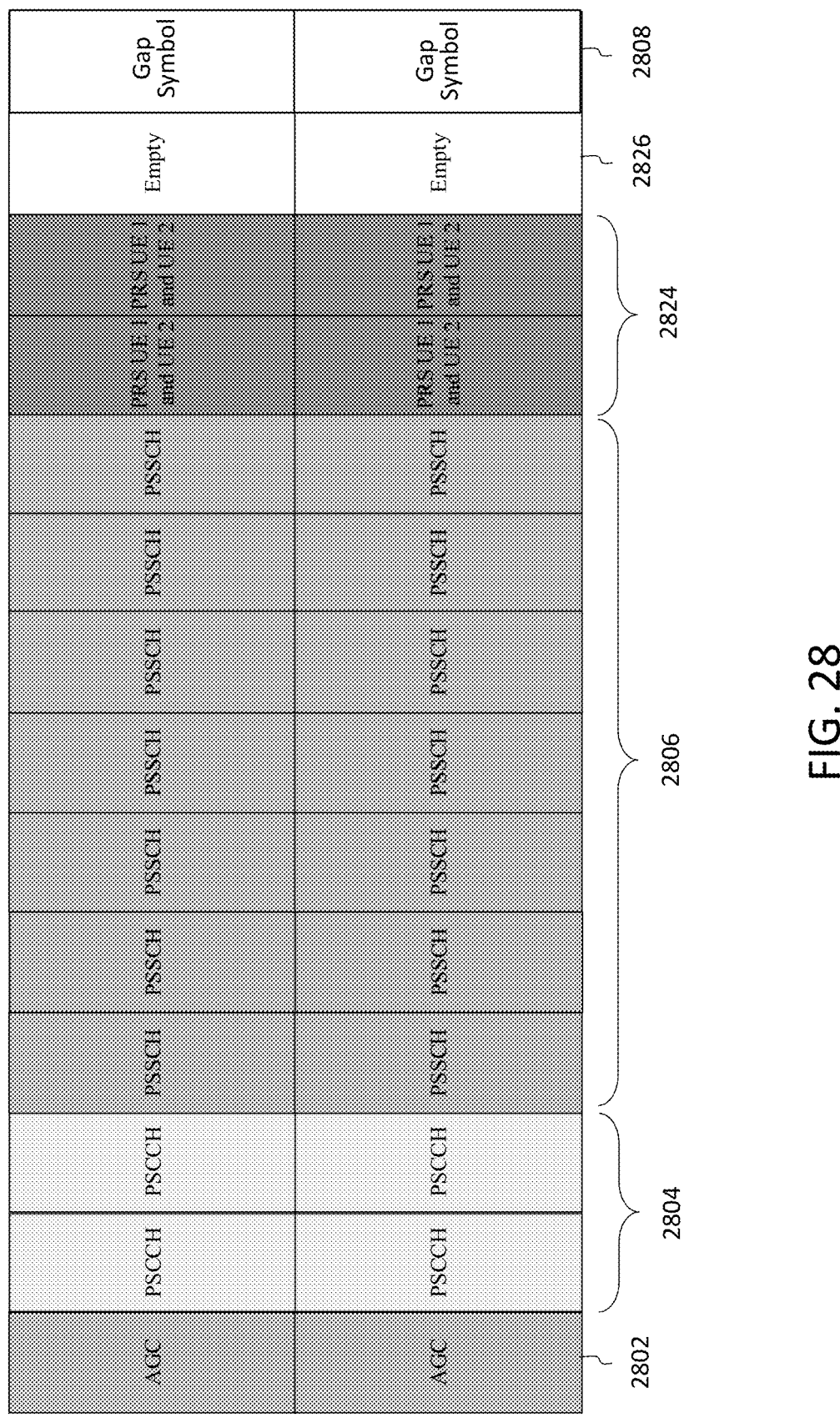
Figure 29:
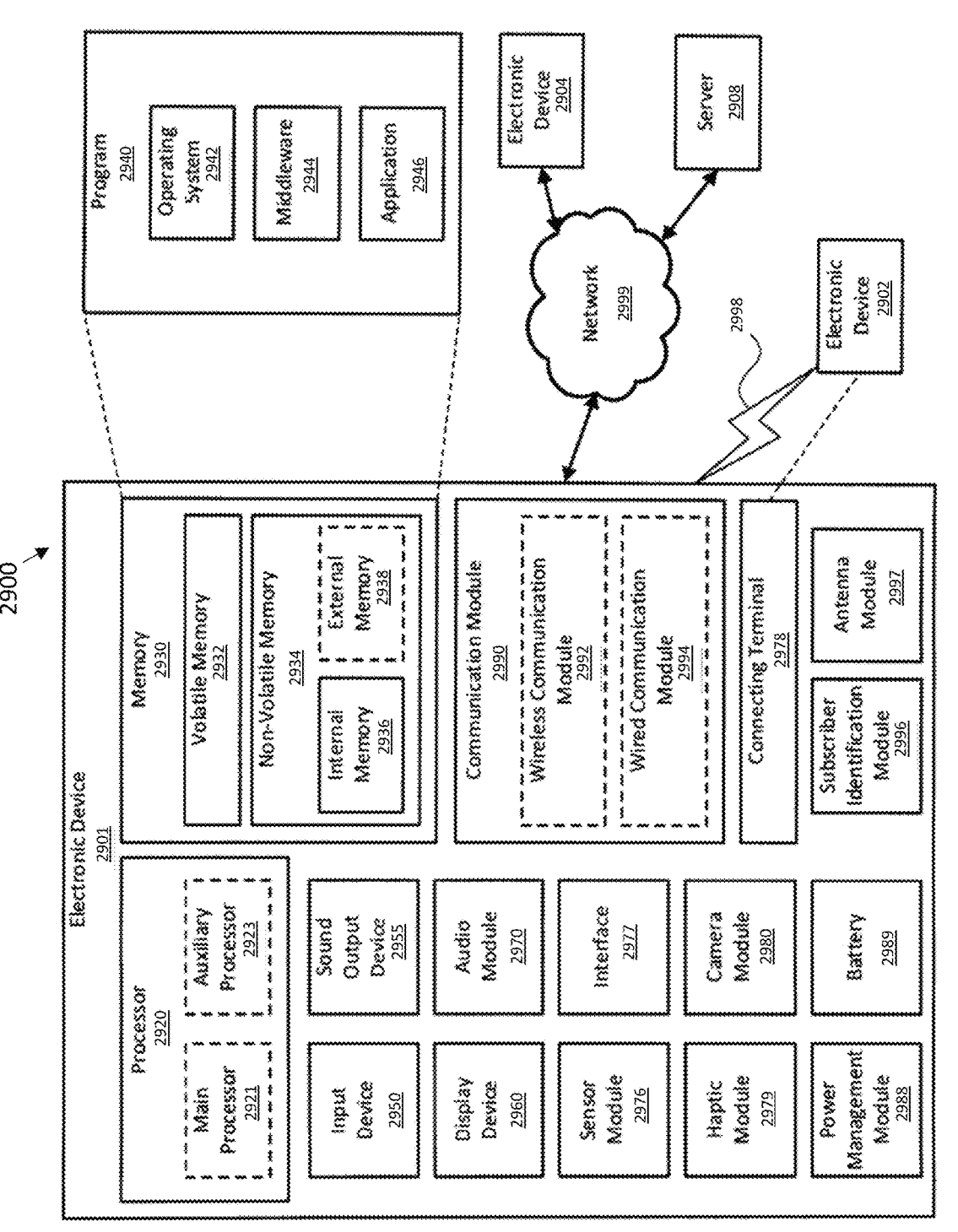

FIG. 26 is a diagram illustrating first and second resource selection assistance schemes, according to an embodiment;

FIG. 27 is a diagram illustrating the transmission of SL-PRS in the physical SL feedback channel (PSFCH) by one UE, according to an embodiment;

FIG. 28 is a diagram illustrating a staggering of PRS signals from two UEs in the PSFCH channel, according to an embodiment; and FIG. 29 is a block diagram of an electronic device in a network environment, according to an embodiment.

DETAILED DESCRIPTION

In the following detailed description, numerous specific details are set forth in order to provide a thorough understanding of the disclosure. It will be understood, however, by those skilled in the art that the disclosed aspects may be practiced without the se specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

Figure 1:
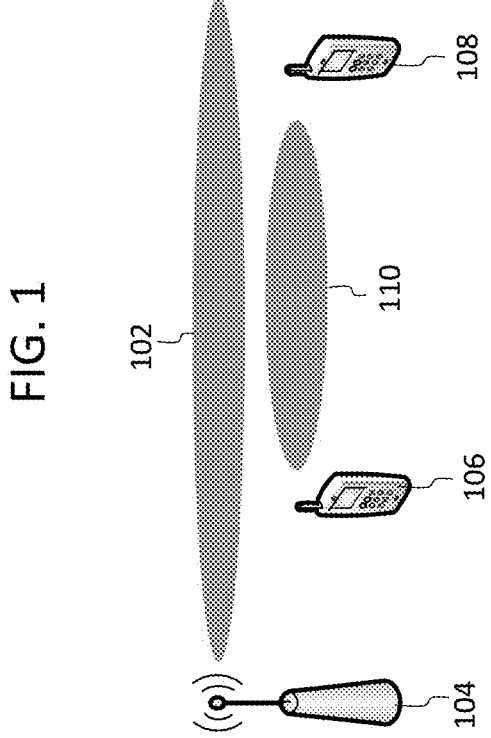
FIG. 1 is a diagram illustrating a communication system, according to an embodiment.

FIG. 1 is a diagram illustrating a communication system, according to an embodiment. In the architecture illustrated in FIG. 1, a control path 102 may enable the transmission of control information through a network established between a base station or a gNode B (gNB) 104, a first UE 106, and a second UE 108. A data path 110 may enable the transmission of data (and some control information) on a SL between the first UE 106 and the second UE 108. The control path 102 and the data path 110 may be on the same frequency or may be on different frequencies.

The 3GPP Rel-16 design of a PRS may be reused for SL positioning. Specifically, the sequences for PRS may be generated by Gold sequences and mapped to quadrature phase shift keying (QPSK) constellation points. At least 4096 different sequence identifiers (IDs) may be supported. Furthermore, a resource element (RE) pattern of a DL PRS may follow a comb-structure with the potential for a larger number of different densities (e.g. 1, 2, 3, 4, 6, 12) per physical resource block (PRB). The bandwidth of the PRS may be configurable. A staggered RE pattern over time and frequency may be used to achieve an effective comb-1 structure at the receiver (i.e., user equipment (UE)).

The PRS sequence r(m) is the QPSK symbol written as Equation (1) below.

$$r(m) = \frac{1}{\sqrt{2}}(1 - 2c(2m)) + j\frac{1}{\sqrt{2}}(1 - 2c(2m+1)) \tag{1}$$

In Equation (1), the pseudo-random sequence c(i) is a length-31 Gold sequence. The output sequence c(n) of length $M_{PN}$, where n=0, 1, . . . , $M_{PN}-1$, may be defined by Equations (2)-(4) below.

$$c(n)=(x_1(n+N_C)+x_2(n+N_C)) \bmod 2 \tag{2}$$

$$x_1(n+31)=(x_1(n+3)+x_1(n)) \bmod 2 \tag{3}$$

$$x_2(n+31)=(x_2(n+3)+x_2(n+2)+x_2(n+1)+x_2(n)) \bmod 2 \tag{4}$$

In Equations (2)-(4), $N_C$=1600 and the first m-sequence $x_1(n)$ may be initialized with $x_1(0)$=1, $x_1(n)$=0, n=1, 2, . . . , 30. The initialization of the second m-sequence, $x_2(n)$ is denoted by $c_{init}=\Sigma_{i=0}^{30}x_2(i) \cdot 2^i$ may be generated by Equation (5) below.

$$c_{init} = \left(2^{22}\left\lfloor \frac{n_{ID,seq}^{PRS}}{1024} \right\rfloor + 2^{10}(N_{symb}^{slot}n_{s,f}^{\mu} + l + 1)(2(n_{ID,seq}^{PRS} \bmod 1024) + 1) + (n_{ID,seq}^{PRS} \bmod 1024)\right) \bmod 2^{31} \tag{5}$$

In Equation (5), $n_{s,f}^{\mu}$ is the slot number, the downlink PRS sequence ID $n_{ID,seq}^{PRS} \in \{0, 1, . . . , 4095\}$ is given by the higher-layer parameter, and l is the orthogonal frequency-division multiplexing (OFDM) symbol within the slot to which the sequence is mapped.

For each downlink PRS resource configured, the UE may assume that the sequence r(m) is scaled with a factor $\beta_{PRS}$ and mapped to resources elements (k, l)$_{p,\mu}$ according to Equations (6)-(9) below.

$$a_{k,l}^{(p,\mu)}=\beta_{PRS}r(m) \tag{6}$$

$$m=0, 1, . . . \tag{7}$$

$$k=mK_{comb}^{PRS}+((k_{offset}^{PRS}+k') \bmod K_{comb}^{PRS}) \tag{8}$$

$$l=l_{start}^{PRS}, l_{start}^{PRS}+1, . . . , l_{start}^{PRS}+L_{PRS}-1 \tag{9}$$

Equations (6)-(9) are based on the following conditions. The resource element (k, l)$_{p,\mu}$ is within the resource blocks occupied by the downlink PRS resource for which the UE is configured. The symbol l is not used by any synchronization signal (SS)/physical broadcast channel (PBCH) block used by the serving cell for downlink PRS transmitted from the serving cell or indicated by the higher-layer parameter for downlink PRS transmitted from a non-serving cell. DL PRS is transmitted in some specific slots which are indicated by high-layer parameters.

Additionally, $l_{start}^{PRS}$ is the first symbol of the downlink PRS within a slot and given by the higher-layer parameter, and the size of the downlink PRS resource in the time domain $L_{PRS} \in \{2, 4, 6, 12\}$ is given by the higher-layer parameter. The comb size $K_{comb}^{PRS} \in \{2, 4, 6, 12\}$ is given by the higher-layer parameter for a downlink PRS resource configured for real time text (RTT)-based propagation delay compensation, otherwise by the higher-layer parameter such that the combination $\{L_{PRS}, K_{comb}^{PRS}\}$ is one of {2, 2}, {4, 2}, {6, 2}, {12, 2}, {4, 4}, {12, 4}, {6, 6}, {12, 6} and {12, 12}. The resource-element offset $k_{offset}^{PRS} \in \{0, 1, . . . , K_{comb}^{PRS}-1\}$ is given by the higher-layer parameter, and the quantity k' is given by Table 1, below.

The reference point for k=0 may be the location of point A of the positioning frequency layer, in which the downlink PRS resource is configured, where point A is given by the higher-layer parameter.

TABLE 1

| | The frequency offset k' as a function of $l - l_{start}^{PRS}$ | | | | | | | | | | | |
|---|---|---|---|---|---|---|---|---|---|---|---|---|
| | Symbol number within the downlink PRS resource $l - l_{start}^{PRS}$ | | | | | | | | | | | |
| $K_{comb}^{PRS}$ | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

Figure 2:
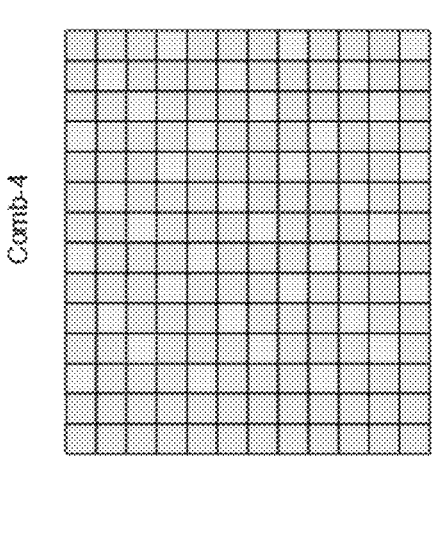
FIG. 2 is a diagram illustrating downlink (DL) PRS resource allocation for $K_{comb}^{PRS}$=2, 4, 6, 12 when, $L_{PRS}$=12 and $1_{start}^{PRS}$=2.
Figure 2:
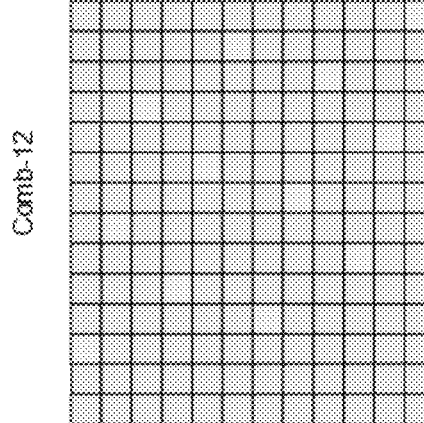
Figure 2:
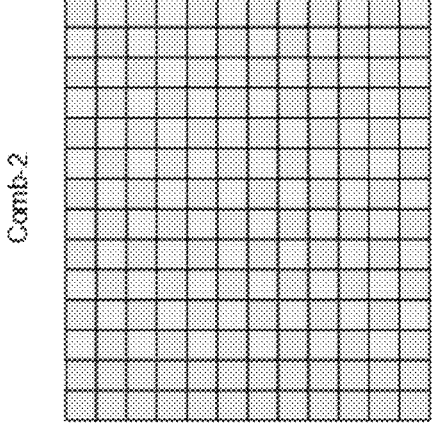
Figure 2:
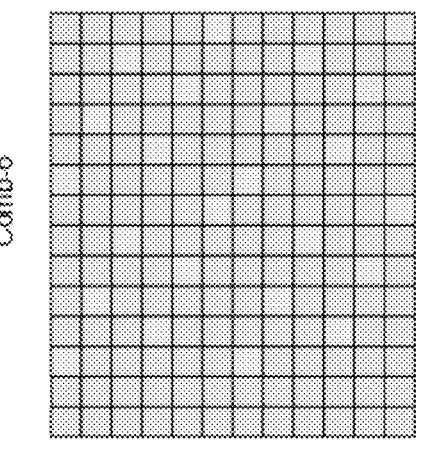
Figure 2:
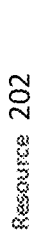

FIG. 2 is a diagram illustrating DL PRS resource allocation for $K_{comb}^{PRS}$=2, 4, 6, 12 when, $L_{PRS}$=12 and $l_{start}^{PRS}$=2. Specifically, PRS resources 202 are shown in each of Comb-2, Comb-4, Comb-6, and Comb-12.

The SRSs for positioning may be defined in uplink (UL). An SRS for positioning may be based on UL SRS design. The periodic, semi-persistent, and aperiodic transmission of an SRS for positioning may be defined for a gNB UL relative time of arrival (RTOA), a UL SRS-reference signal received power (RSRP), a UL-angle of arrival (AoA), a gNB receive (Rx)-transmit (Tx) time difference measurements to facilitate support of UL time difference of arrival (TDOA), a UL AoA, and multi-RTT positioning methods.

Various enhancements of SRS for positioning purposes were proposed as part of 3GPP Rel-16. A staggered resource element mapping similar to DL PRS, which allows for an effective full bandwidth signal to be received at the measurement point, may be an enhancement to SRS in Rel-16. In addition, multiple enhancements aimed at higher amounts of orthogonality between UEs may be introduced, including higher comb size and flexible symbol starting position within a slot. The ability to allow transmission power control that takes into account the fact that reception at a neighboring cell is desired is included in Rel-16. The number of OFDM symbols that can be configured for SRS may be increased for positioning purposes in order to increase the number of gNBs that can hear the SRS with sufficient power to make accurate RTOA measurements.

The SRS sequence for an SRS resource may be generated according to Equations (10)-(12) below.

$$r^{(pi)}(n, l')=r_{u,v}^{(\alpha_i,\delta)}(n) \tag{10}$$

$$0 \leq n \leq M_{sc,b}^{SRS}-1 \tag{11}$$

$$l' \in \{0, 1, . . . , N_{symb}^{SRS}-1\} \tag{12}$$

In Equations (10)-(12), $M_{sc,b}^{SRS}$ is the length of the SRS sequence, $\delta=\log_2(K_{TC})$, and the transmission comb number $K_{TC} \in \{2, 4, 8\}$ is contained in the higher-layer parameter transmissionComb.

The low-peak to average power (PAPR) sequence $r_{u,v}^{(\alpha,\delta)}(n)$ may be defined by a cyclic shift $\alpha$ of a base sequence $\bar{r}_{u,v}(n)$ according to Equations (13) and (14) below.

$$r_{u,v}^{(\alpha,\delta)}(n) = e^{j\alpha n}\bar{r}_{u,v}(n), \tag{13}$$

$$0 \leq n < M_{ZC} \tag{14}$$

In Equations (13) and (14), $M_{ZC} = mN_{sc}^{RB}/2^{\delta}$ is the length of the sequence. Multiple sequences may be defined from a single base sequence through different values of $\alpha$ and $\delta$. Base sequences $\bar{r}_{u,v}(n)$ are divided into groups, where $u \in \{0, 1, \dots, 29\}$ is the group number and $v$ is the base sequence number within the group. The cyclic shift $\alpha_i$ for antenna port $p_i$ is given according to Equations (15) and (16) below.

$$\alpha_i = 2\pi \frac{n_{SRS}^{cs,i}}{n_{SRS}^{cs,max}}, \tag{15}$$

$$n_{SRS}^{cs,i} = \left(n_{SRS}^{cs} + \frac{n_{SRS}^{cs,max}(p_i - 1000)}{N_{ap}^{SRS}}\right) \bmod n_{SRS}^{cs,max} \tag{16}$$

In Equations (15) and (16), $n_{SRS}^{cs} \in \{0, 1, \dots, n_{SRS}^{cs,max}-1\}$ is contained in the higher layer parameter transmissionComb.

An SRS resource may span $N_{symb}^{SRS} \in \{1, 2, 4, 8, 10, 12, 14\}$ consecutive OFDM symbols and may start from any symbol within a slot. In the frequency domain, an SRS may have a comb structure with the comb size of $K_{TC} \in \{2, 4, 8\}$. SRS transmissions from different devices may be frequency multiplexed within the same frequency range by being assigned different combs corresponding to different frequency offsets. For example, with a comb-2 structure, SRS may be transmitted on every second subcarrier, and two SRSs may be frequency multiplexed.

Figure 3:
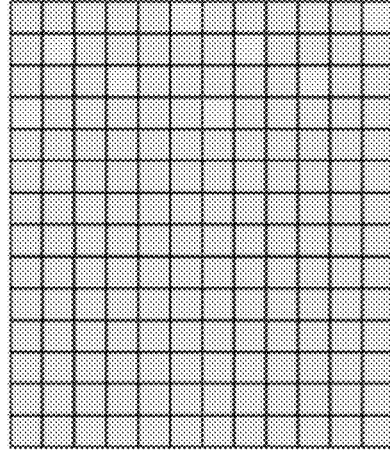
FIG. 3 is a diagram illustrating sounding reference signal (SRS) time/frequency structures with 4 symbol SRS.
Figure 3:
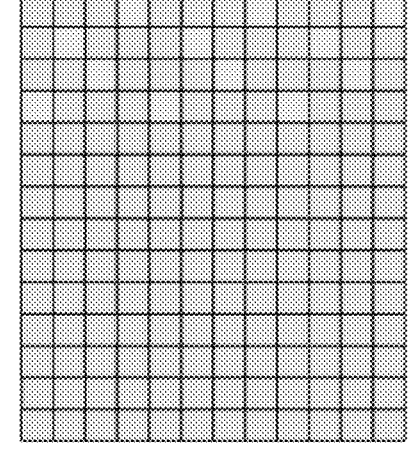
Figure 3:
Figure 3:
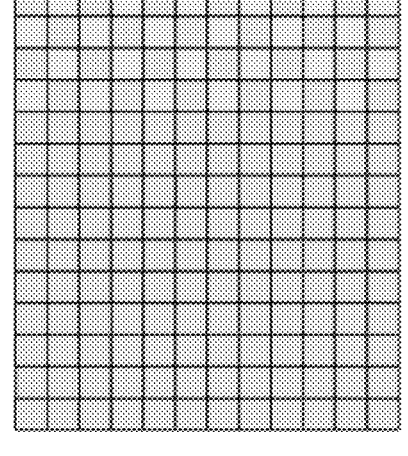

FIG. 3 is a diagram illustrating SRS time/frequency structures with 4 symbols SRS. Specifically, SRS resource elements 302 are shown in each of Comb-2, Comb-4, and Comb-8.

A basic time/frequency structure of an SRS is shown in FIG. 3, with SRS symbol length $N_{symb}^{SRS} = 4$ in a slot. For a different SRS symbol length and a different starting position in the time domain, the time/frequency structure for SRS may be different. Specifically, the starting position in the time domain is given by $l_0 = N_{symb}^{slot}-1-l_{offset}$ where the offset $l_{offset} \in \{0, 1, \dots, 13\}$ counts symbols backwards from the end of the slot and is given by the field startPosition contained in the higher layer parameter resourceMapping. If the SRS is configured by the information element (IE) [SRS-for-positioning], the frequency offset $k_{offset}^{l'}$ (which is the offset within the comb structure) may then be determined by the comb-size $K_{TC}$ and SRS symbol length $N_{symb}^{SRS}$, which is given by Table 2, otherwise $k_{offset}^{l'}=0$.

TABLE 2

The offset $k_{offset}^{l'}$ for SRS as a function of $K_{TC}$ and l'.

| $K_{TC}$ | $k_{offset}^0, \dots, k_{offset}^{N_{symb}^{SRS}-1}$ | | | | |
|---|---|---|---|---|---|
| | $N_{symb}^{SRS}=1$ | $N_{symb}^{SRS}=2$ | $N_{symb}^{SRS}=4$ | $N_{symb}^{SRS}=8$ | $N_{symb}^{SRS}=12$ |
| 2 | 0 | 0, 1 | 0, 1, 0, 1 | — | — |
| 4 | — | 0, 2 | 0, 2, 1, 3 | 0, 2, 1, 3, 0, 2, 1, 3 | 0, 2, 1, 3, 0, 2, 1, 3, 0, 2, 1, 3 |
| 8 | — | — | 0, 4, 2, 6 | 0, 4, 2, 6, 1, 5, 3, 7 | 0, 4, 2, 6, 1, 5, 3, 7, 0, 4, 2, 6 |

In SRS transmission, 1/2/4 antenna ports may be used and the different ports may share the same set of resource elements and the same basic SRS sequence. Thus, different phase rotations (i.e., cyclic shifts) may be applied to separate the different ports. The maximum number of the cyclic shift may be determined by the comb size.

A SL physical channel corresponds to a set of resource elements carrying information originating from higher layers. A physical SL shared channel (PSSCH) carries $2^{nd}$ stage SCI and a SL data payload. A physical SL broadcast channel (PSBCH) is equivalent to PBCH in Uu link. A PSCCH carries $1^{st}$ stage SCI. A PSFCH carries 1-bit HARQ-ACK feedback.

A SL physical signal corresponds to a set of resource elements used by the physical layer, but does not carry information originating from higher layers. A demodulation reference signal (DM-RS) is for PSCCH, PSSCH and PSBCH. A channel-state information reference signal (CSI-RS) is for CSI measurement on SL. A phase-tracking reference signals (PT-RS) is for frequency range 2 (FR2) phase noise compensation. A SL primary synchronization signal (S-PSS) is for synchronization on SL. A SL secondary synchronization signal (S-SSS) is for synchronization on SL.

In new radio (NR) SL, a self-contained approach is considered, whereby each slot contains control, data, and, in some cases, feedback. A regular NR SL slot includes 14 OFDM symbols. However, the SL may also be (pre-) configured to occupy less than 14 symbols in a slot.

SCI in NR vehicle to everything (V2X) may be transmitted in two stages. The first stage SCI (SCI format 1-A) carried on PSCCH includes information to enable sensing operations, as well as the resource allocation field for the scheduling of PSSCH and $2^{nd}$ stage SCI. The second stage SCI (SCI format 2-A or SCI format 2-B) is transmitted in PSSCH resources and associated with the PSSCH DMRS, which includes information for decoding PSSCH.

The PSCCH and PSSCH may be multiplexed in time and frequency within the same slot. Depending on whether or not feedback is configured for a given slot, there may be different slot formats.

Figure 4:
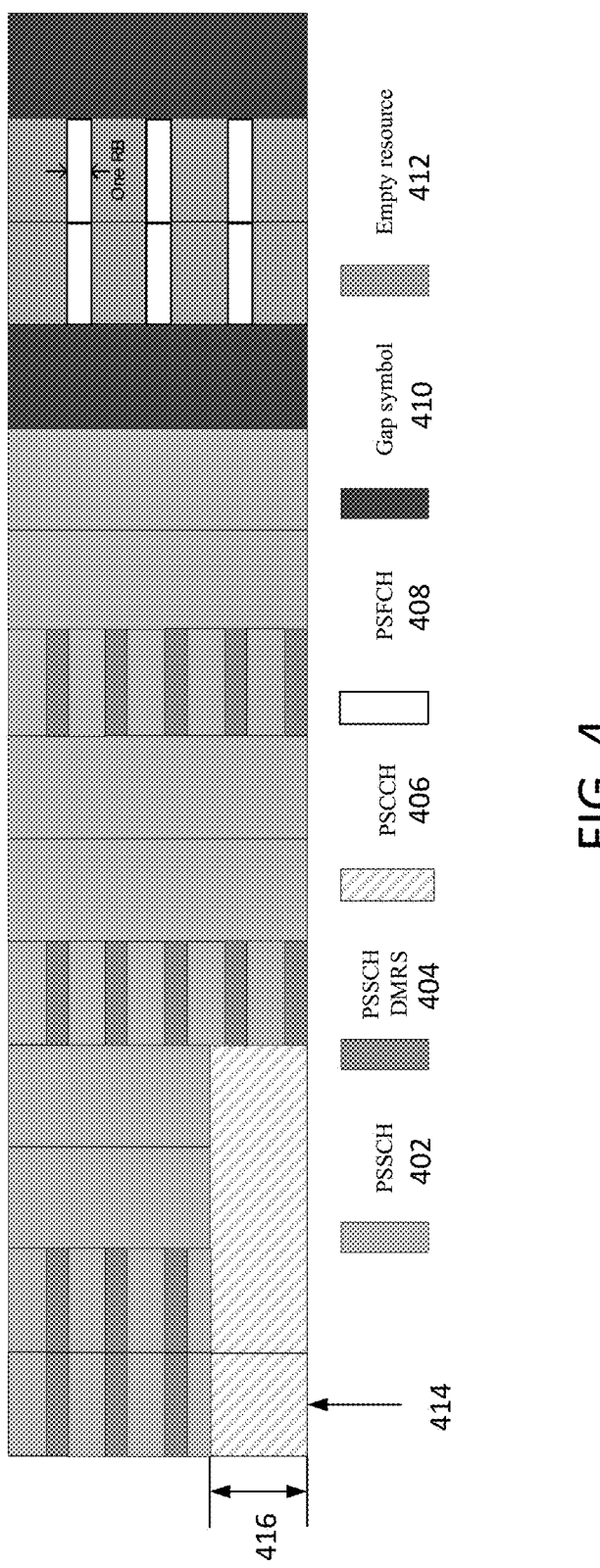
FIG. 4 is a diagram illustrating a slot format for a case with feedback resources configured.

FIG. 4 is a diagram illustrating a slot format for a case with feedback resources configured. The slot structure is shown with PSSCH 402, PSSCH DMRS 404, PSCCH 406, PSFCH 408, gap symbol 410, and empty resources 412. A first symbol 414 in a subchannel 416 is a copy of a second symbol.

Figure 5:
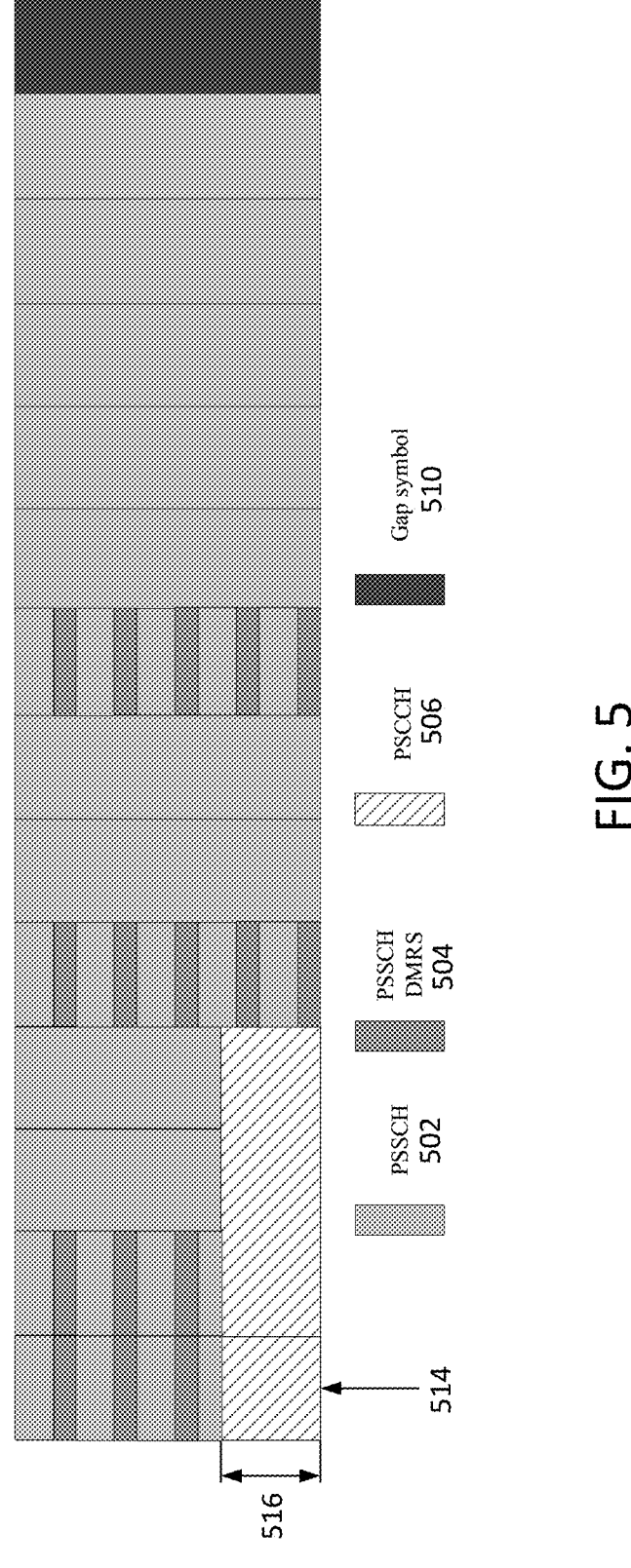
FIG. 5 is a diagram illustrating a slot format for a case without feedback resources configured.

FIG. 5 is a diagram illustrating a slot format for a case without feedback resources configured. The slot structure is shown with PSSCH 502, PSSCH DMRS 504, PSCCH 506, and gap symbol 510. A first symbol 514 in a subchannel 516 is a copy of a second symbol.

In the two slot formats of FIGS. 4 and 5, the first symbol is repeated for AGC settling, and the last symbol of the slot is left as a gap to allow for Tx/Rx switching. The 1st stage SCI is carried in the PSCCH 406 or 506 with 2 or 3 symbols with format named as SCI format 1-A. The number of PSCCH symbols is explicitly (pre-)configured per Tx/Rx resource pool by the higher layer parameter sl-TimeResour- cePSCCH. The lowest RB of the PSCCH 406 or 506 is the same as a lowest RB of the corresponding PSSCH 402 or 502. In the frequency domain, the number of RBs in the PSCCH 406 or 506 is pre-configured, which is not greater than the size of one sub-channel. In this case, if a UE is using multiple consecutive subchannels for SL transmission within a slot, the PSCCH 406 or 506 will only exist in the first subchannel.

The SL shared channel (SL-SCH), which carries the transport blocks (TBs) of data for transmission over SL, and the 2nd stage SCI may be carried over the PSSCH 402 or 502. The resources in which the PSSCH 402 or 502 is transmitted may be scheduled or configured by a gNB (i.e., Mode 1) or determined through a sensing procedure con- ducted autonomously by the transmitter (i.e., Mode 2).

The feedback (if it exists as shown in FIG. 4) may be carried over the PSFCH 408. This channel is used to transmit the feedback information from the Rx to the Tx UEs. It may be used for unicast and groupcast options 2/1. In case of unicast and groupcast option 2 the PSFCH 408 may be used to transmit acknowledgment (ACK)/negative acknowledg- ment (NACK), whereas for the case of groupcast option 1, the PSFCH 408 may carry only NACK. For SL feedback, a sequence-based PSFCH format (PSFCH format 0) with one symbol (not including AGC training period) may be sup- ported. In PSFCH format 0, the ACK/NACK bit may be transmitted through two Zadoff-Chu (ZC) sequences of length 12 (same root but different cyclic shift), whereby presence of one sequence indicates an ACK and the presence of the other indicates a NACK (i.e., these sequences are used in a mutually exclusive manner).

For the resource allocation of a SL-PRS, there are two potential candidates. First, a dedicated resource pool may be configured for the SL-PRS, in which there are only control (i.e., sent in a control region as shown in 804 of FIG. 8) and PRS symbols, and not data symbols, in the slots. Second, a shared resource pool may be (pre-)configured for SL-PRS, in which symbols for control, data, and PRS are in one slot.

Embodiments of the disclosure provide solutions for the time and frequency resource allocation for reference signal transmissions when a dedicated resource pool is configured.

The slot structure for PRS with a dedicated resource pool is similar to existing SL slots. Specifically, one slot includes an AGC symbol at the beginning of the slot, a guard symbol, and symbols at the beginning of the slot (2 or 3) dedicated for PSCCH transmission.

The middle symbols may be reserved for the SL-PRS transmission. In order to simplify the structure, the UE may or may not transmit a $2^{nd}$-stage SCI. If there is no $2^{nd}$-stage SCI in the slot, the time and frequency resource allocation of SL-PRS may be indicated by $1^{st}$-stage SCI. In order for the AGC setting to be correct, the PSCCH symbol needs to span an entire bandwidth of the PRS with the same overall transmit power. This is not anticipated to be an issue since, for example, the remaining PRBs within the same symbols occupied by the PSCCH may be filled by the repetitions of PSCCH transmission.

Figure 6:
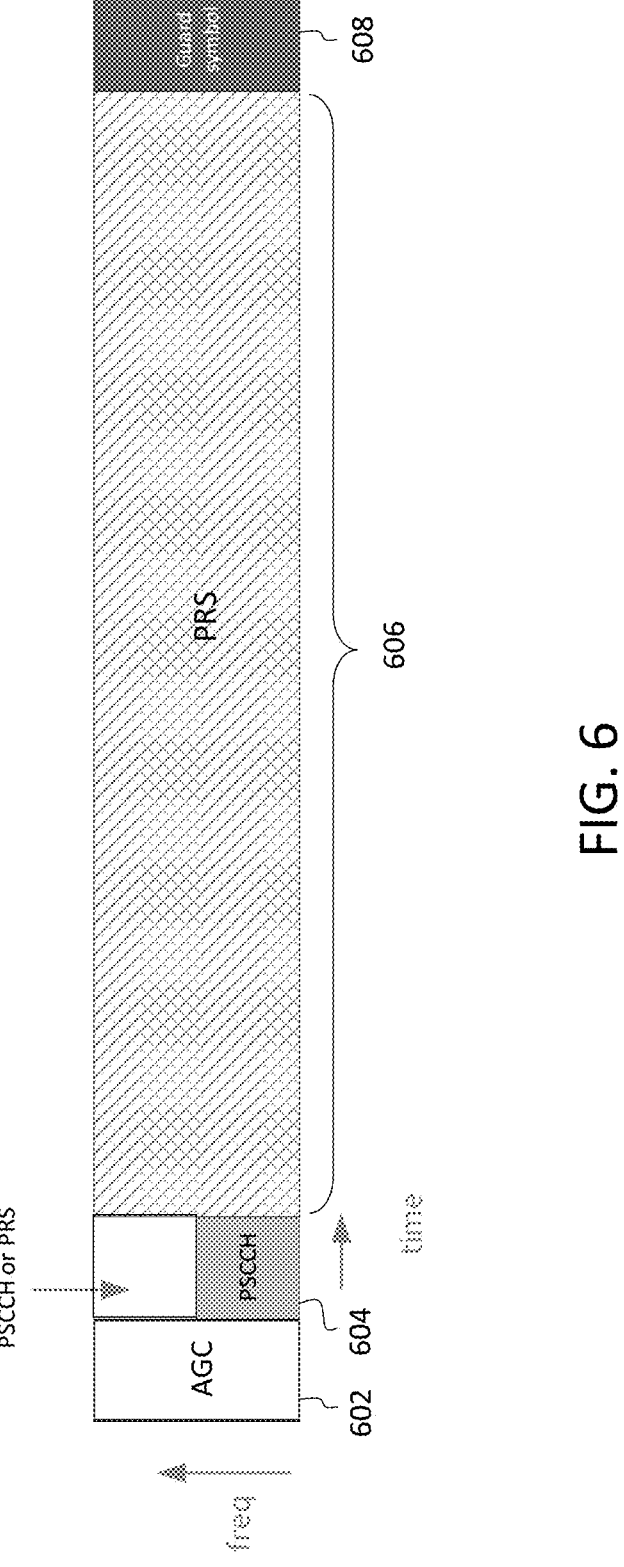
FIG. 6 is a diagram illustrating a SL-PRS slot structure in a dedicated SL-PRS pool without 2nd stage SL control information (SCI), according to an embodiment.
Figure 7:
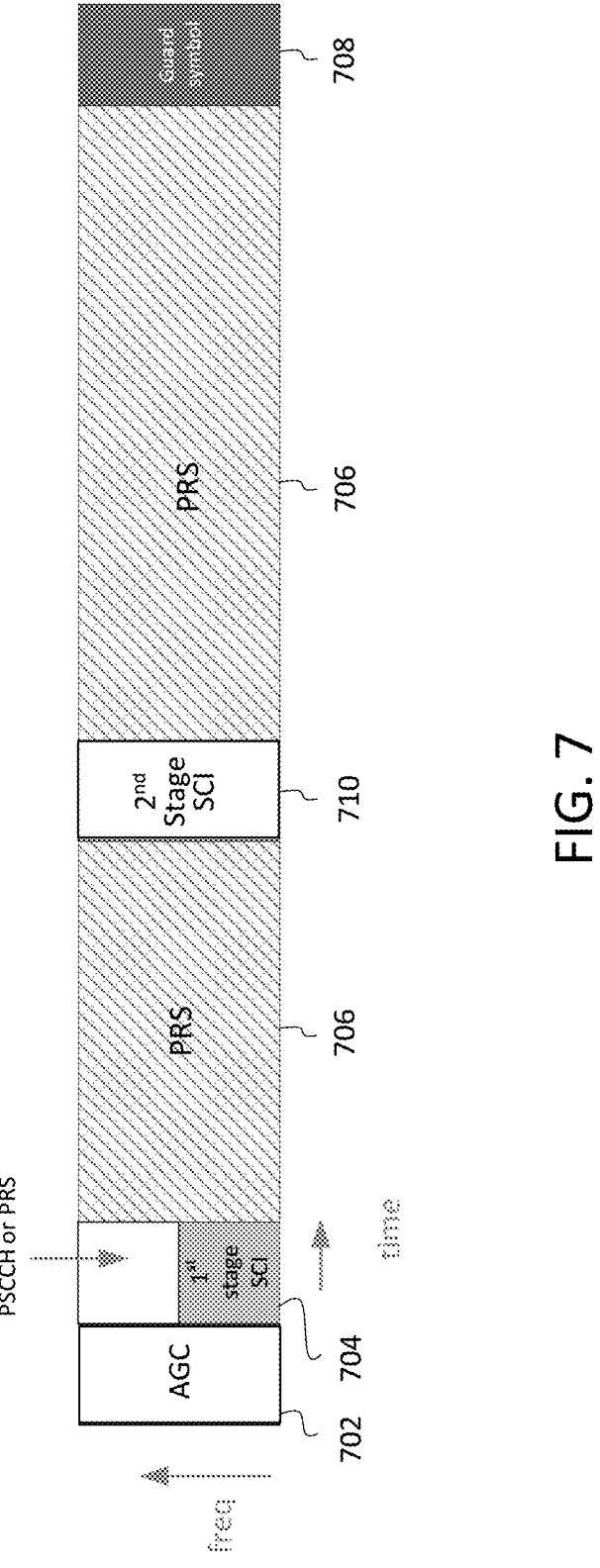
FIG. 7 is a diagram illustrating the SL-PRS slot structure in the dedicated SL-PRS pool with 2nd stage SCI, according to an embodiment.

FIG. 6 is a diagram illustrating a SL-PRS slot structure in a dedicated SL-PRS pool without 2nd stage SCI, according to an embodiment. FIG. 7 is a diagram illustrating the SL-PRS slot structure in the dedicated SL-PRS pool with 2nd stage SCI, according to an embodiment.

The slot structure for a dedicated resource pool configured for SL-PRS may include one AGC symbol 602 or 702 at the beginning of the SL-PRS slot, two or three symbols for PSCCH transmission 604 or 704, symbols for SL-PRS based on resource pool configuration 606 or 706, and one guard symbol 608 or 708 for Tx/Rx switching. $2^{nd}$ stage SCI/ PSSCH 710 may be present in or absent from the slot (control information is carried in the PSSCH without data).

For the frequency domain pattern, the comb size N for SL-PRS and number of PRS symbols M may be (pre-) configured by higher layer signaling. It may be desirable to have N and M as small values because, if the link quality between the UEs performing positioning is good, a short SL-PRS is enough. In addition, for the RTT method, it may be necessary to have a fast turnaround and fast processing of the SL-PRS, and to possibly time-multiplex multiple SL- PRSs in one slot. Another benefit of using small values for M and N is for Doppler compensation in a high speed scenario. A range of the Doppler estimation is related to the time gap between two repeated PRS symbols (i.e., the smaller the time gap, the higher the Doppler shift that can be estimated). Thus, it may be desirable to have a small comb size for PRS so that higher Doppler shift may be compen- sated.

In other scenarios, having large values of M, N may be preferable. This is the case, for example, when UEs are far from each other and are gathering as much energy as possible for the SL-PRS. In such a case, having the SL-PRS occupying all of the available symbols may be preferable.

In general, the comb-size of PRS N should satisfy N≤M. The values of comb size N may be N={1, 2, 4, 6, 8, 12} since the maximum value of M is 12 when the PSCCH and PRS can be frequency multiplexed (i.e., 14 OFDM symbols per slot excluding two symbols for the gap and AGC).

For the design of comb-size N and PRS symbol M, two cases may be considered. In a first case, there is no punc- turing for SL-PRS symbols, which means that SL-PRS and PSCCH symbols are time division multiplexed (TDM) only, and cannot be located in the same symbol. In a second case, there is puncturing for SL-PRS symbols, which means that the SL-PRS and $1^{st}$ stage SCI may be located in the same symbol with frequency division multiplexing (FDM).

For the first case and when the PSCCH occupies 2 symbols, there may be up to ten symbols that can be used for the SL-PRS. Thus, the following values for M may be supported.

Figure 8:
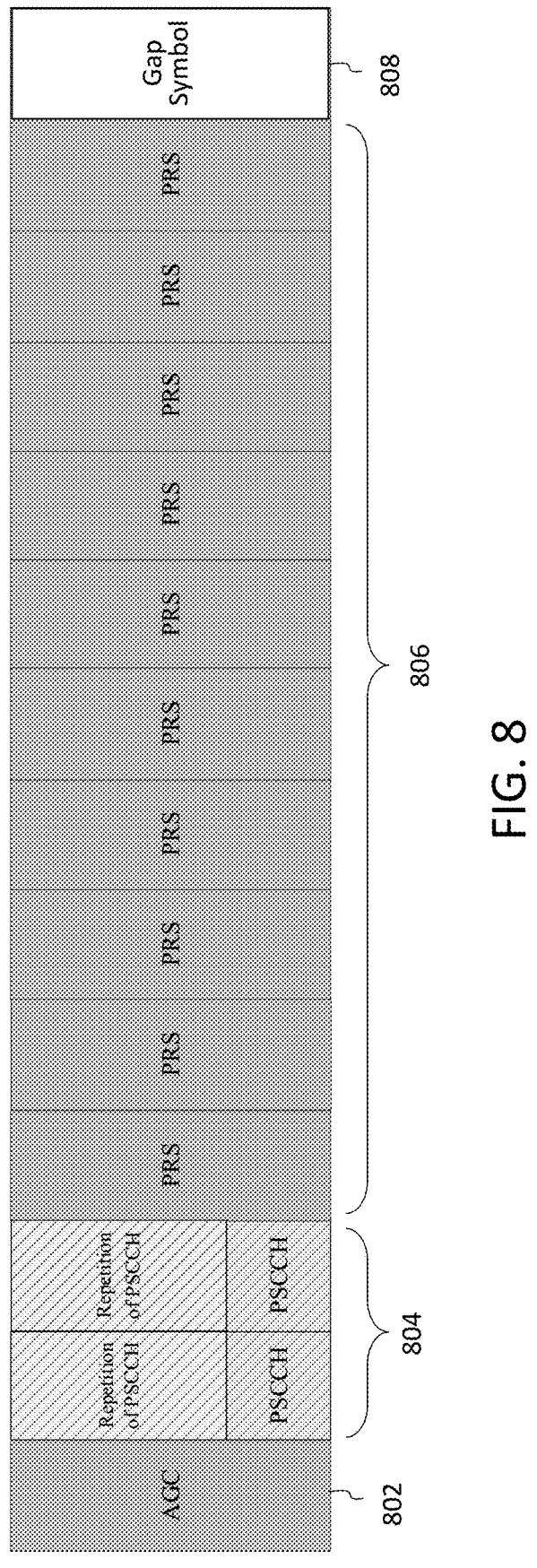
FIG. 8 is a diagram illustrating a slot structure for M=10 SL-PRS symbols, according to an embodiment.

FIG. 8 is a diagram illustrating a slot structure for M=10 SL-PRS symbols, according to an embodiment. Specifically, FIG. 8 illustrates M=10 SL-PRS symbols in one slot.

FIG. 8 shows M=10 symbols 806 for the SL-PRS occu- pying all the symbols except a first symbol 802, a last symbol 808, and PSCCH symbols 804. The first symbol 802 is for AGC and the last symbol 808 is a gap symbol for Tx/Rx switching. The PSCCH (i.e., SCI) needs to perform repetition to make sure the power on the PSCCH symbols 804 is equal to the SL-PRS symbol to have a correct AGC estimation. Alternatively, when only one subchannel is used by the UE for transmission, the PSCCH subchannel size may be configured such that the PSCCH and PSSCH have the same subchannel size. This is mainly applicable for cases with larger subcarrier spacing and limited SL bandwidth.

Figure 9:
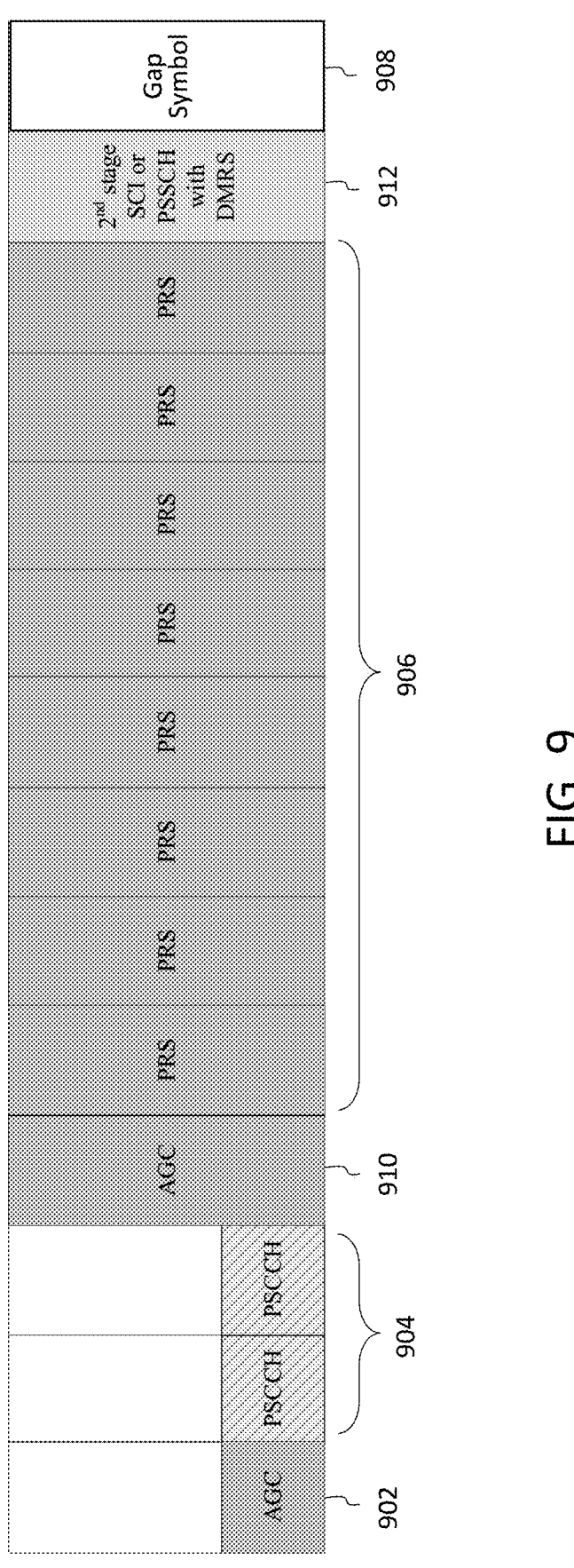
FIG. 9 is a diagram illustrating a slot structure for M=8 SL-PRS symbols with two automatic gain control (AGC) symbols in one slot, according to an embodiment.

FIG. 9 is a diagram illustrating a slot structure for M=8 SL-PRS symbols with two AGC symbols in one slot, accord- ing to an embodiment. For M=8, there may be two AGC symbols 902 and 910, with one at the beginning of the slot and one after PSCCH symbols 904 but preceding SL-PRS symbols 906. There is also one symbol 912 for the $2^{nd}$ stage SCI or PSSCH which carries the measurement report for positioning. A last symbol 908 is a gap symbol for Tx/Rx switching. However, there are some resources unused for this design, making it less efficient.

Figure 10:
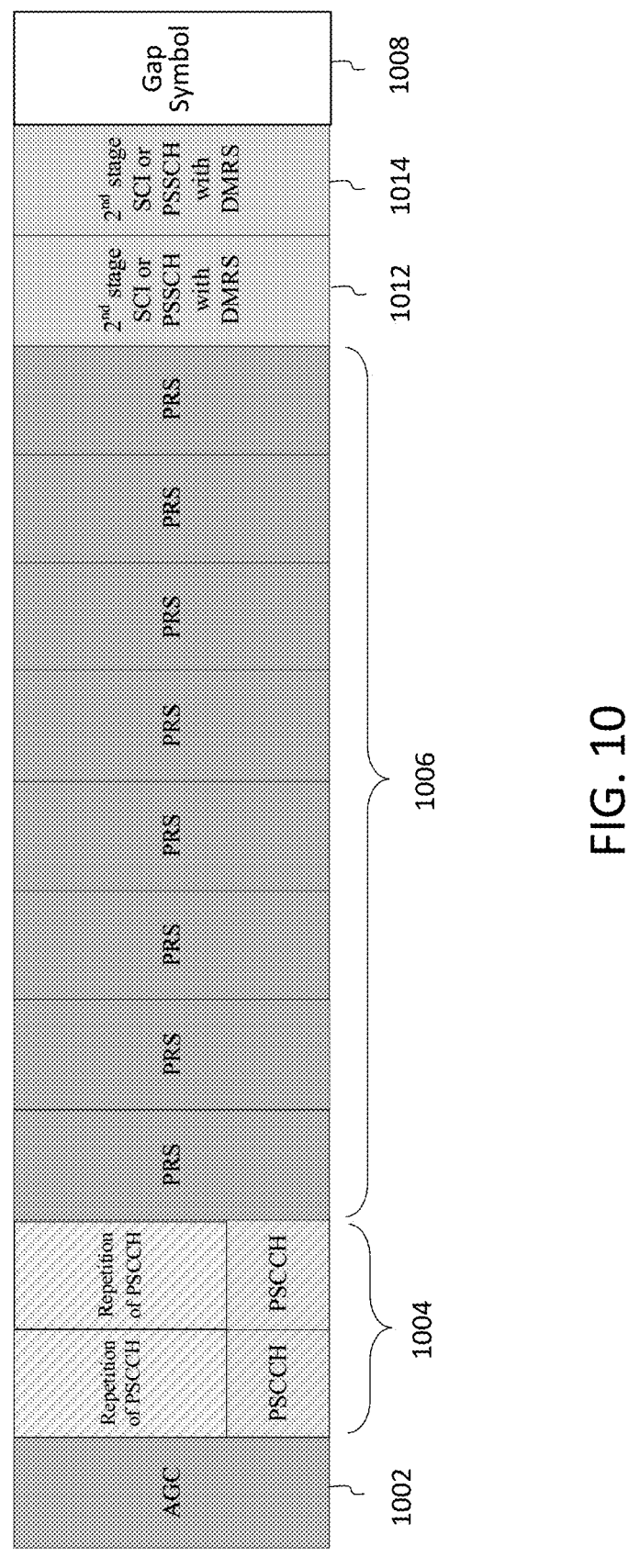
FIG. 10 is a diagram illustrating a slot structure for M=8 SL-PRS symbols with one AGC symbol in one slot, according to an embodiment.

FIG. 10 is a diagram illustrating a slot structure for M=8 SL-PRS symbols with one AGC symbol in one slot, according to an embodiment. There may be a single AGC symbol 1002 at the beginning of the slot preceding PSCCH symbols 1004 and SL-PRS symbols 1006. This design for M=8, introduces two symbols 1012 and 1014 for $2^{nd}$ stage SCI or PSSCH for carrying the measurement results for positioning. A last symbol 1008 is a gap symbol for Tx/Rx switching. The AGC design in FIG. 10 has better utilization of resources when compared with the AGC design in FIG. 9.

Figure 11:
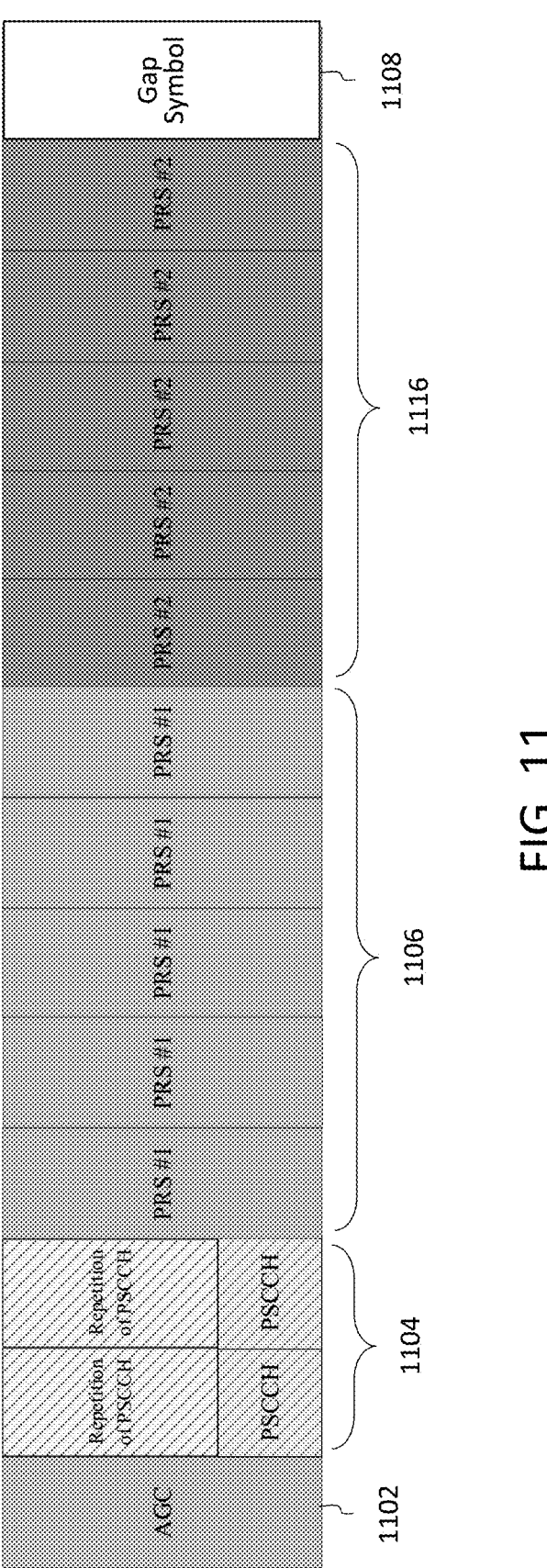
FIG. 11 is a diagram illustrating M=5 SL-PRS symbols for two SL-PRS sequences in one slot, according to an embodiment.

FIG. 11 is a diagram illustrating M=5 SL-PRS symbols for two SL-PRS sequences in one slot, according to an embodiment. M=5 is similar to M=10 but with two SL-PRS sequences with different resource IDs multiplexing in the time domain (in addition to frequency multiplexing). Specifically, FIG. 11 shows M=5 symbols 1106 for a first SL-PRS sequence and M=5 symbols 1116 for a second SL-PRS sequence. One SL-PRS resource may be located either in the first or the second half of the slot. The first and second PRS signals may be transmitted by the same UE (i.e., there is no need for another AGC symbol in between the two PRS transmissions within the slot). Thus the SL-PRS symbols occupy all the symbols except a first symbol 1102, a last symbol 1108, and PSCCH symbols 1104. The first symbol 1102 is for AGC and the last symbol 1108 is a gap symbol for Tx/Rx switching.

Figure 12:
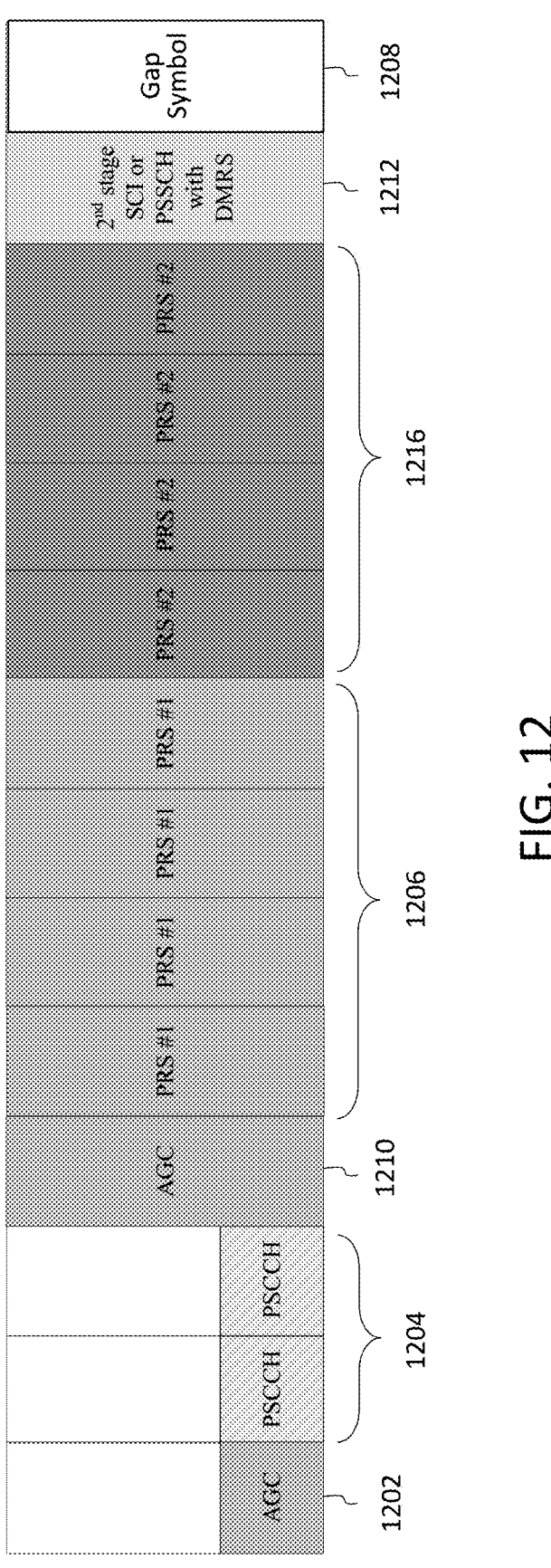
FIG. 12 is a diagram illustrating M=4 SL-PRS symbols for two SL-PRS sequences and two AGC symbols in one slot, according to an embodiment.

FIG. 12 is a diagram illustrating M=4 SL-PRS symbols for two SL-PRS sequences and two AGC symbols in one slot, according to an embodiment. M=4 is similar to M=8 but with two SL-PRS sequences with different resource IDs multiplexing in time domain (in addition to the frequency multiplexing). One SL-PRS resource can be located either in the first or the second half of the slot. Note that there is no need for an additional AGC before the $2^{nd}$ PRS transmission because it is transmitted by the same UE.

With respect to FIG. 12, there may be two AGC symbols 1202 and 1210, with one at the beginning of the slot and one after PSCCH symbols 1204, but preceding SL-PRS symbols 1206. There is also one symbol 1212 for the $2^{nd}$ stage SCI or PSSCH which carries the measurement report for positioning. A last symbol 1208 is a gap symbol for Tx/Rx switching. M=4 symbols 1206 are shown for a first SL-PRS sequence and M=4 symbols 1216 are shown for a second SL-PRS sequence. However, there are some resources unused for this design, making it less efficient.

Figure 13:
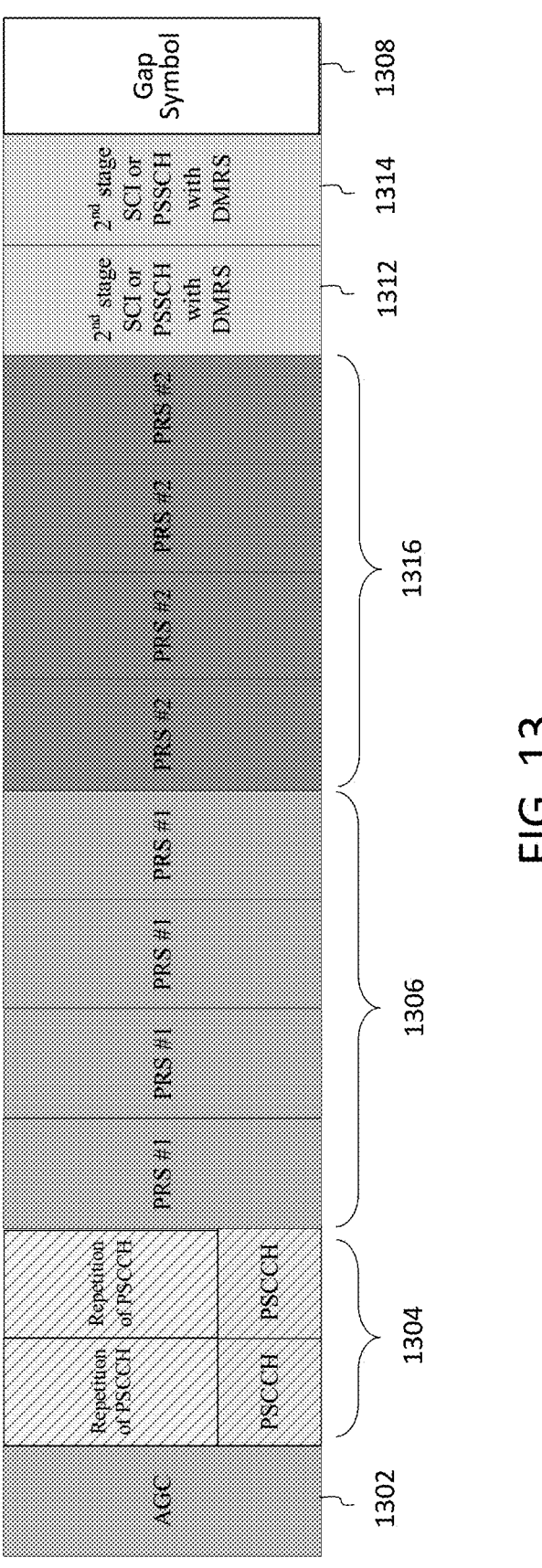
FIG. 13 is a diagram illustrating M=4 SL-PRS symbols for two SL-PRS sequences and one AGC symbol in one slot, according to an embodiment.

FIG. 13 is a diagram illustrating M=4 SL-PRS symbols for two SL-PRS sequences and one AGC symbol in one slot, according to an embodiment. There may be a single AGC symbol 1302 at the beginning of the slot preceding PSCCH symbols 1304 and SL-PRS symbols 1306. This design for M=4, introduces two symbols 1312 and 1314 for $2^{nd}$ stage SCI or PSSCH for carrying the measurement results for positioning. A last symbol 1308 is a gap symbol for Tx/Rx switching. M=4 symbols 1306 are shown for a first SL-PRS sequence and M=4 symbols 1316 are shown for a second SL-PRS sequence. The AGC design in FIG. 13 has better utilization of resources compared with the AGC design in FIG. 12.

M=2 is a case where a very short SL-PRS may be used. If the principle of the M=10 case is applied, there are up to 5 SL-PRSs multiplexed in time. If the principle of the M=8 case is applied, there are up to 4 SL-PRSs multiplexed in time.

For the second case and when the PSCCH occupies 3 symbols, there may be up to 9 symbols for the SL-PRS. In such a case, the value of M is set forth below.

Figure 14:
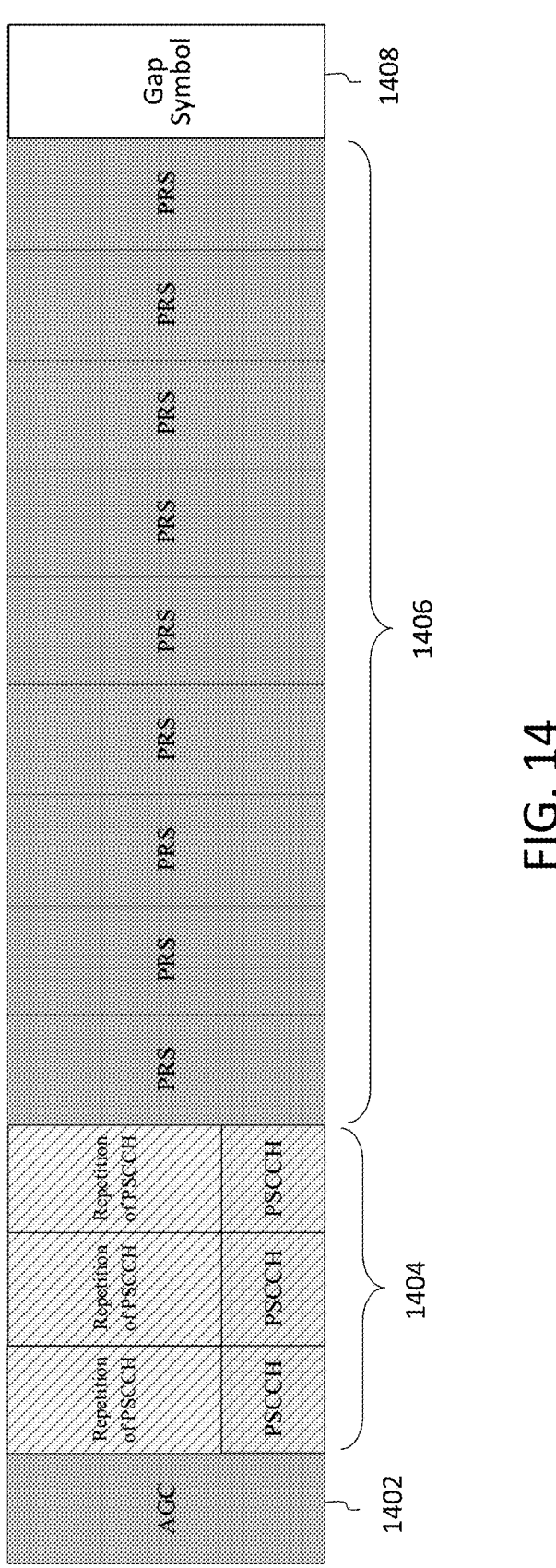
FIG. 14 is a diagram illustrating M=9 SL-PRS symbols with three PSCCH symbols in one slot, according to an embodiment.

FIG. 14 is a diagram illustrating M=9 SL-PRS symbols with 3 PSCCH symbols in one slot, according to an embodiment. Specifically, FIG. 14 shows M=9 symbols 1406 for SL-PRS occupying all of the symbols except a first symbol 1402, a last symbol 1408, and PSCCH symbols 1404. The first symbol 1402 is for AGC and the last symbol 1408 is a gap symbol for Rx/Tx switching. The PSCCH (i.e., SCI) needs to perform repetition to make sure the power on the PSCCH symbols 1404 is equal to the SL-PRS symbol. PSCCH repetition may not be needed if the UE uses only one subchannel for transmission and if the SL PSCCH and PSSCH are configured to have the same size as discussed above.

Figure 15:
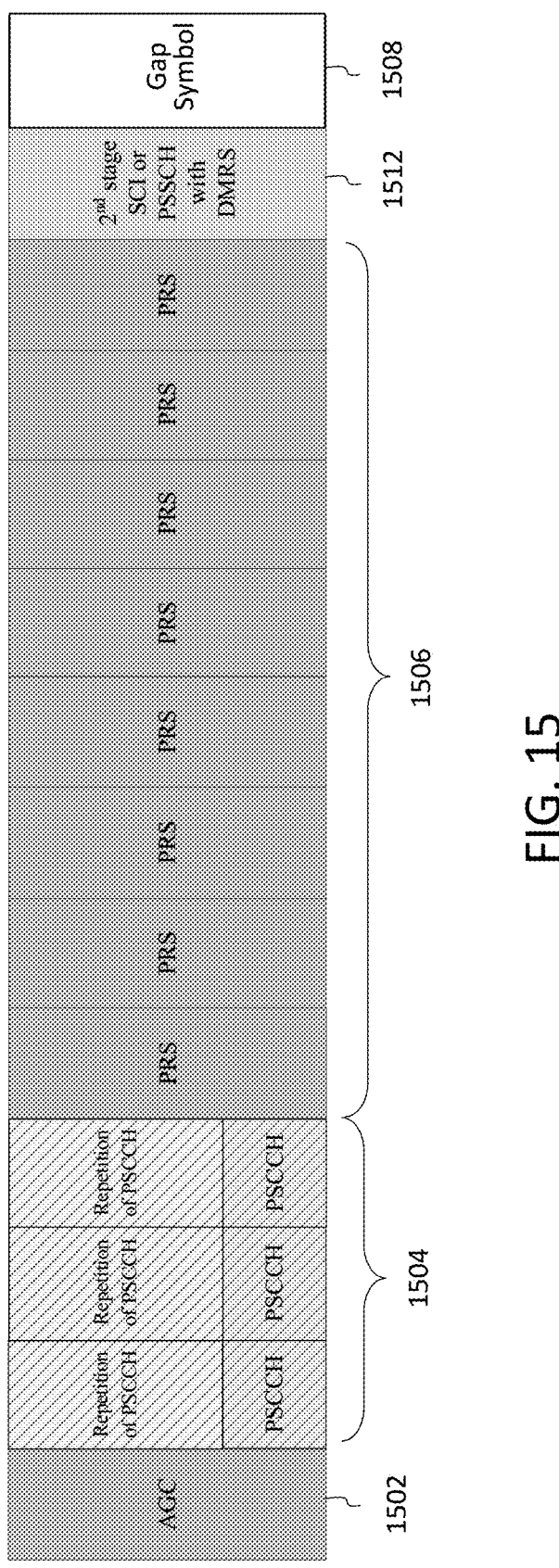
FIG. 15 is a diagram illustrating M=8 SL-PRS symbols with three PSCCH symbols and one AGC symbol in one slot, according to an embodiment.

FIG. 15 is a diagram illustrating M=8 SL-PRS symbols with 3 PSCCH symbols and one AGC symbol in one slot, according to an embodiment. For M=8, there are two possible designs. In the first design shown in FIG. 15, a slot includes one symbol 1512 for a $2^{nd}$ stage SCI and/or PSCCH, which may carry the measurement report. The one symbol 1512 follows the an AGC symbol 1502, PSCCH symbols 1504, and SL-PRS symbols 1506, and precedes a gap symbol 1508.

Figure 16:
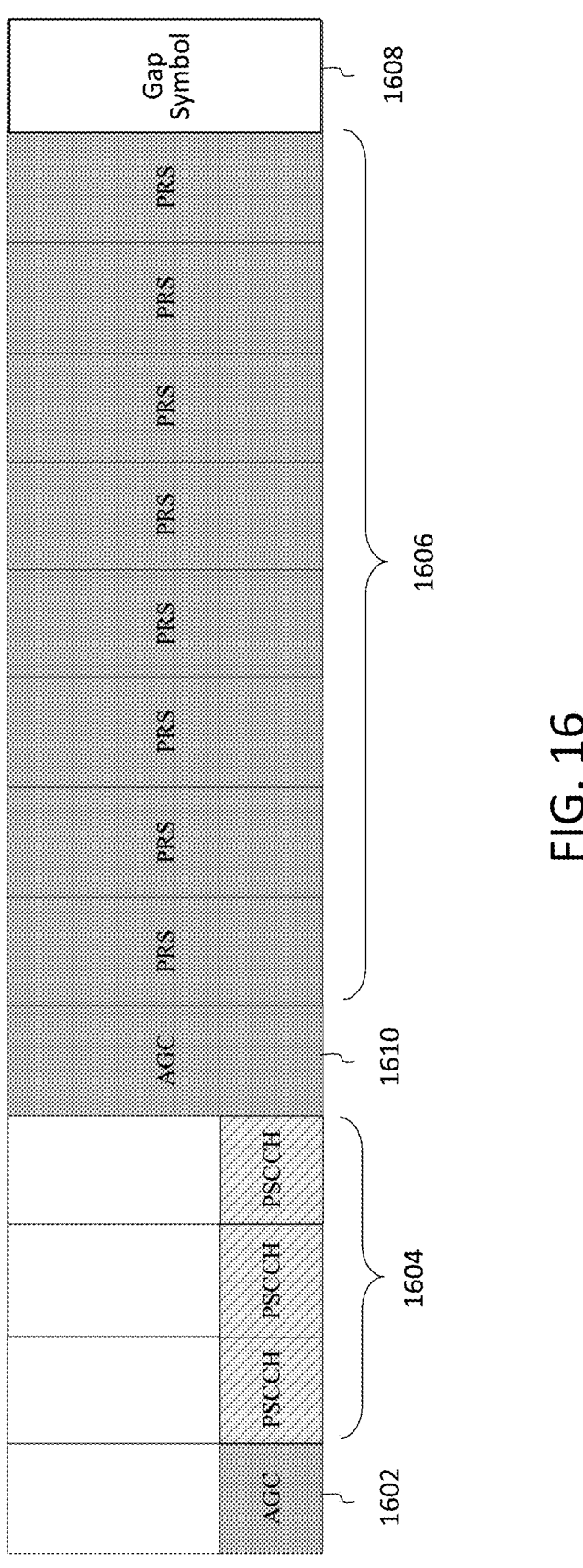
FIG. 16 is a diagram illustrating M=8 SL-PRS symbols with three PSCCH symbols and two AGC symbols in one slot, according to an embodiment.

FIG. 16 is a diagram illustrating M=8 SL-PRS symbols with 3 PSCCH symbols and two AGC symbols in one slot, according to an embodiment. In this second design, a slot includes two AGC symbols 1602 and 1610, one at the beginning of the slot and one after PSCCH symbols 1604, but preceding SL-PRS symbols 1606 and a gap symbol 1608. The second design of FIG. 16 is less efficient with respect to resource utilization as compared with the first design of FIG. 15.

For M=6, there may be one SL-PRS set including six consecutive SL-PRS symbols, and the slot structure is similar to that of the case where M=8. The difference is that the last 3 symbols before the gap symbol in FIG. 15 are used for $2^{nd}$ stage SCI or PSSCH transmission. Similarly, the last 2 symbols before the gap symbol in FIG. 16 are used for $2^{nd}$ stage SCI or PSCCH transmission.

Figure 17:
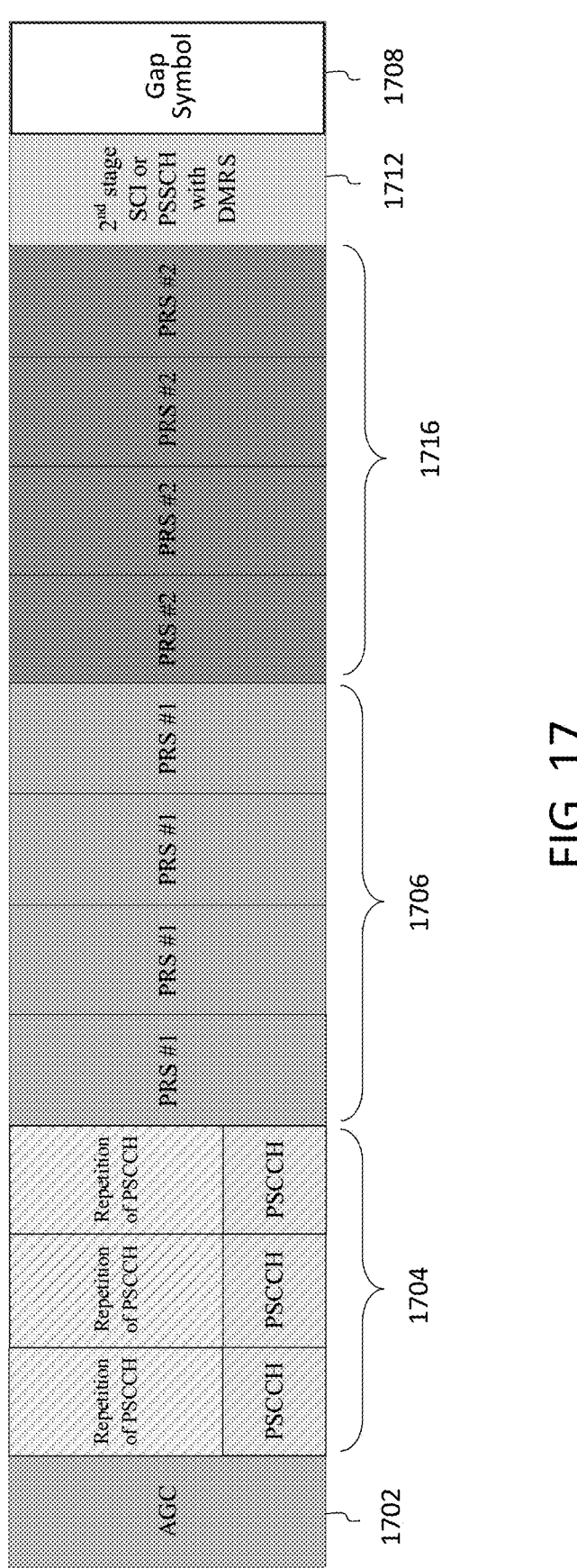
FIG. 17 is a diagram illustrating M=4 SL-PRS symbols with three PSCCH symbols and one AGC symbol in one slot, according to an embodiment.

FIG. 17 is a diagram illustrating M=4 SL-PRS symbols with 3 PSCCH symbols and one AGC symbol in one slot, according to an embodiment. M=4 is an extension of the case for M=8, but there may be up to 2 SL-PRS sets, and each includes 4 consecutive SL-PRS symbols in the slot. A slot includes one symbol 1712 for a $2^{nd}$ stage SCI and/or PSCCH, which may carry the measurement report. The one symbol 1712 follows an AGC symbol 1702, PSCCH symbols 1704, a first set of SL-PRS symbols 1706, and a second set of SL-PRS symbols 1716, and precedes a gap symbol 1708. There is no need for a second AGC before the second PRS transmission because it is performed by the same UE.

Figure 18:
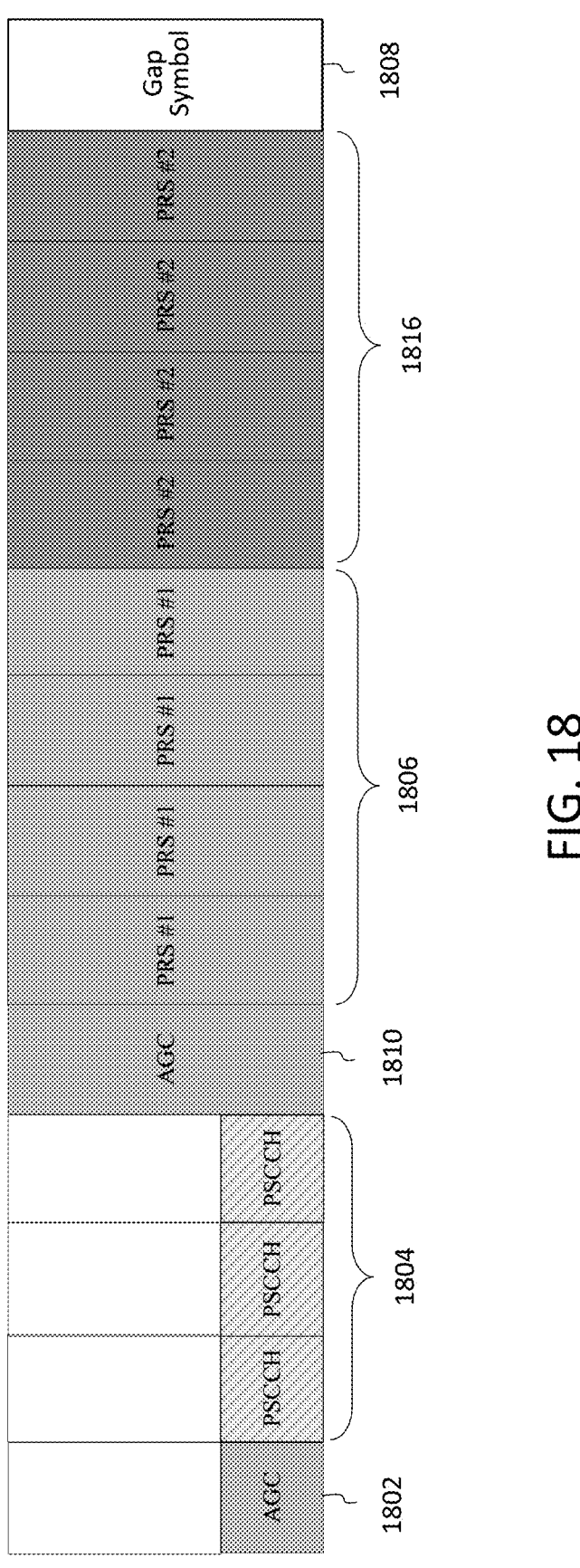
FIG. 18 is a diagram illustrating M=4 SL-PRS symbols with three PSCCH symbols and two AGC symbols in one slot, according to an embodiment.

FIG. 18 is a diagram illustrating M=4 SL-PRS symbols with 3 PSCCH symbols and two AGC symbols in one slot, according to an embodiment. In this second design, a slot includes two AGC symbols 1802 and 1810, one at the beginning of the slot and one after PSCCH symbols 1804, but preceding a first set of SL-PRS symbols 1806, a second set of SL-PRS symbols 1816, and a gap symbol 1808. The second design of FIG. 18 is less efficient with respect to resource utilization as compared with the first design of FIG. 17.

Figure 19:
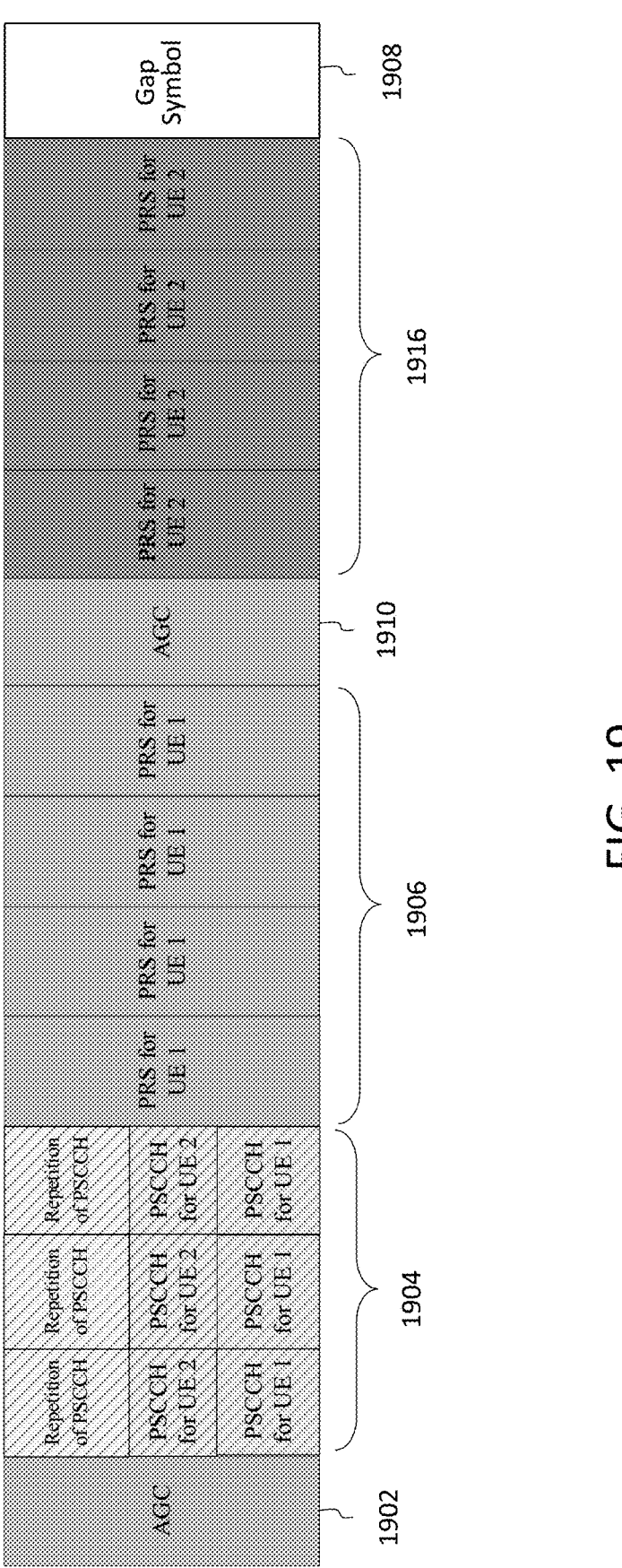
FIG. 19 is a diagram illustrating M=4 SL-PRS symbols with two UE transmitting SL-PRS in different subslots, according to an embodiment.

FIG. 19 is a diagram illustrating M=4 SL-PRS symbols with two UEs transmitting SL-PRS in different subslots, according to an embodiment. FIG. 19 shows another design for M=4 SL-PRS symbols in which the SL-PRS resource only occupies a part of one slot (i.e., a subslot). Such design can be used for the SL-PRS resource allocation for RTT method, in which two UEs (both anchor UE and target UE) are transmitting SL-PRS at different time instances. Then, the anchor UE can allocate SL-PRS resource in the first half of the slot and the target UE can allocate the SL-PRS resource in the second half of the slot.

Specifically, in FIG. 19, a slot includes two AGC symbols 1902 and 1910, one at the beginning of the slot and one between a first set of SL-PRS symbols 1906 and a second set of SL-PRS symbols 1916. The PSCCH symbols 1904 include PSCCH symbols for a first UE, PSCCH symbols for a second UE, and a repetition of the PSCCH symbols. The slot ends with a gap symbol 1008.

For M=2, a very short SL-PRS may be used. If the design principle of M=4 case is applied, there are up to 4 SL-PRSs multiplexed in time for the M=2 case. There is no need for AGC per PRS transmission here because the 4 SL-PRSs will be transmitted by the same UE.

There may be up to 12 symbols that can be used for the SL-PRS. In this case, the SL-PRS occupies all the symbols except for the first and last symbol in the slot (the first symbol is a copy of the $2^{nd}$ symbol for AGC training). There are two possible designs for M=12 case.

Figure 20:
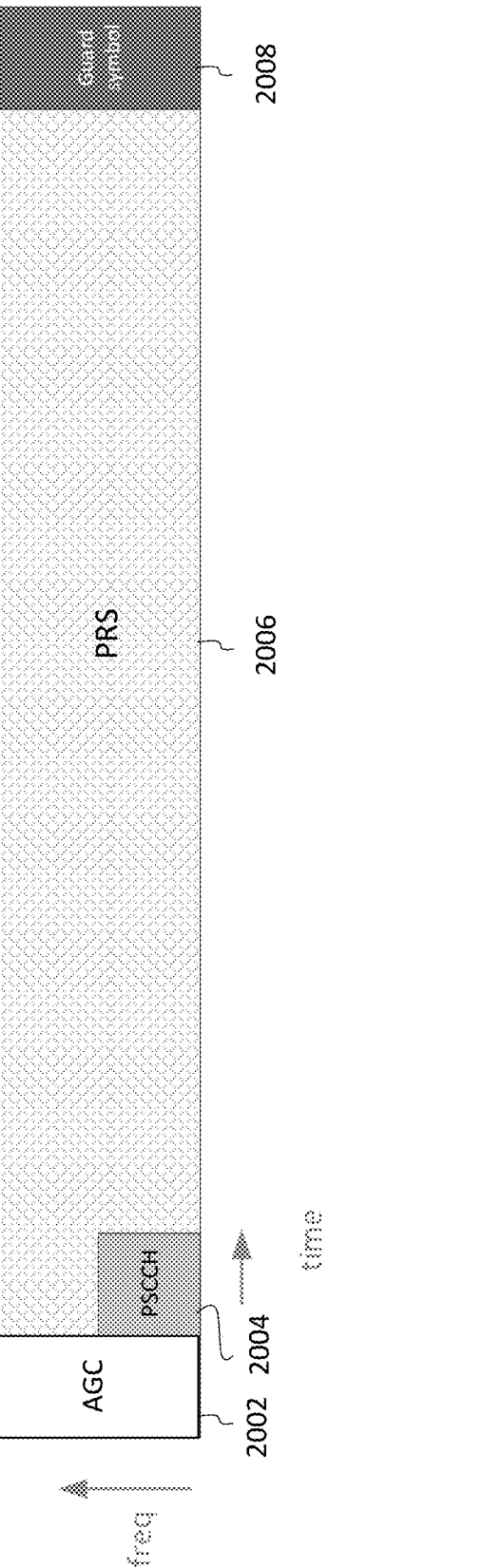
FIG. 20 is a diagram illustrating M=12 SL-PRS symbols with PSCCH and PRS multiplexing, according to an embodiment.

FIG. 20 is a diagram illustrating M=12 SL-PRS symbols with PSCCH and PRS multiplexing, according to an embodiment. In a first design for M=12 shown in FIG. 20, the SL-PRS symbols 2006 are multiplexed in the frequency domain with PSCCH symbols 2004. The SL-PRS resource overlapping with PSCCH in time domain may be punctured. The slot begins with an AGC symbol 2002 and ends with a guard symbol 2008.

Figure 21:
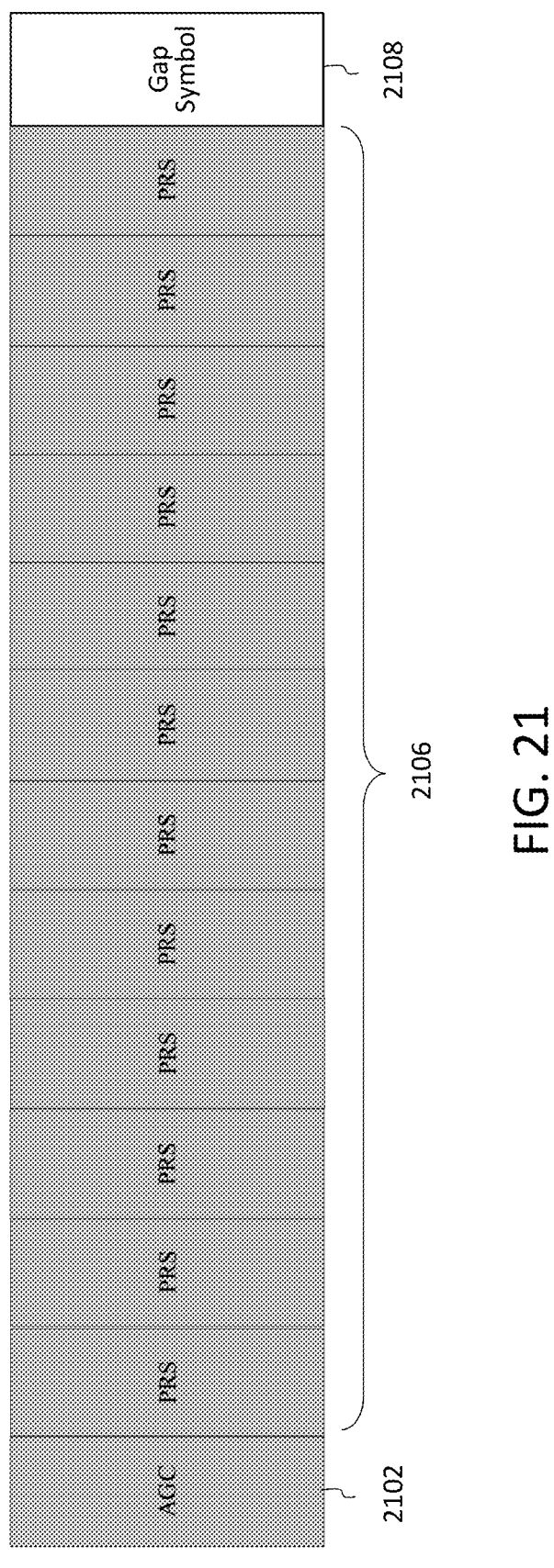
FIG. 21 is a diagram illustrating illustrates M=12 SL-PRS symbols without PSCCH, according to an embodiment.

FIG. 21 is a diagram illustrating M=12 SL-PRS symbols without PSCCH, according to an embodiment. In this second design for M=12, the dedicated resource pool for SL-PRS is pre-configured by higher layer signaling and there are no control symbols in the slot. The slot begins with an AGC symbol 2102, followed by SL-PRS symbols 2106, and ends with a gap symbol 2108. Cross-carrier or cross-resource pool scheduling may be considered in this case by sending the resource reservation in the SCI in another resource pool to acquire the resources for PRS transmission.

The case of M=11 SL-PRS symbols may also be supported, in which the SL-PRS occupy 11 SL-PRS symbols out of the 12 SL-PRS symbols shown in FIG. 19 and FIG. 20. The last symbol can be filled with the repetition of the previously transmitted SL-PRS symbol, for example, the first SL-PRS symbol can be repeated in the 13th symbol of the slot, as shown in FIG. 21.

For the case when M>N (i.e., the SL-PRS symbol length is greater than the comb size), the last M-N SL-PRS symbols may be the repetition of the M-N symbols of the first N SL-PRS symbols.

The symbols carrying $2^{nd}$ stage SCI and/or PSSCH always include the DMRS resources which are multiplex with $2^{nd}$ stage SCI or PSSCH in frequency domain. The SL-PRS transmission should avoid the collision with the DMRS resources. To address this issue, the UE shall not transmit SL-PRS in the symbols carrying $2^{nd}$ stage SCI or PSSCH.

The comb size N for SL-PRS can take the same value as the SL-PRS symbol length M, i.e., N=M={1, 2, 4, 5, 6, 8, 9, 10, 12} for the dedicated resource pool in SL positioning. In this case, the resources in the SL-PRS slot are fully utilized.

There are two modes that may be supported for SL-PRS resource allocation.

A first mode is the network-centric operation SL-PRS resource allocation. In this scheme, the network (e.g. gNB, location management function (LMF), gNB and LMF) allocates resources for SL-PRS.

The second mode is the UE autonomous SL-PRS resource allocation. In this scheme, one of the UE(s) participating in the SL positioning operation allocates resources for SL-PRS.

Figure 22:
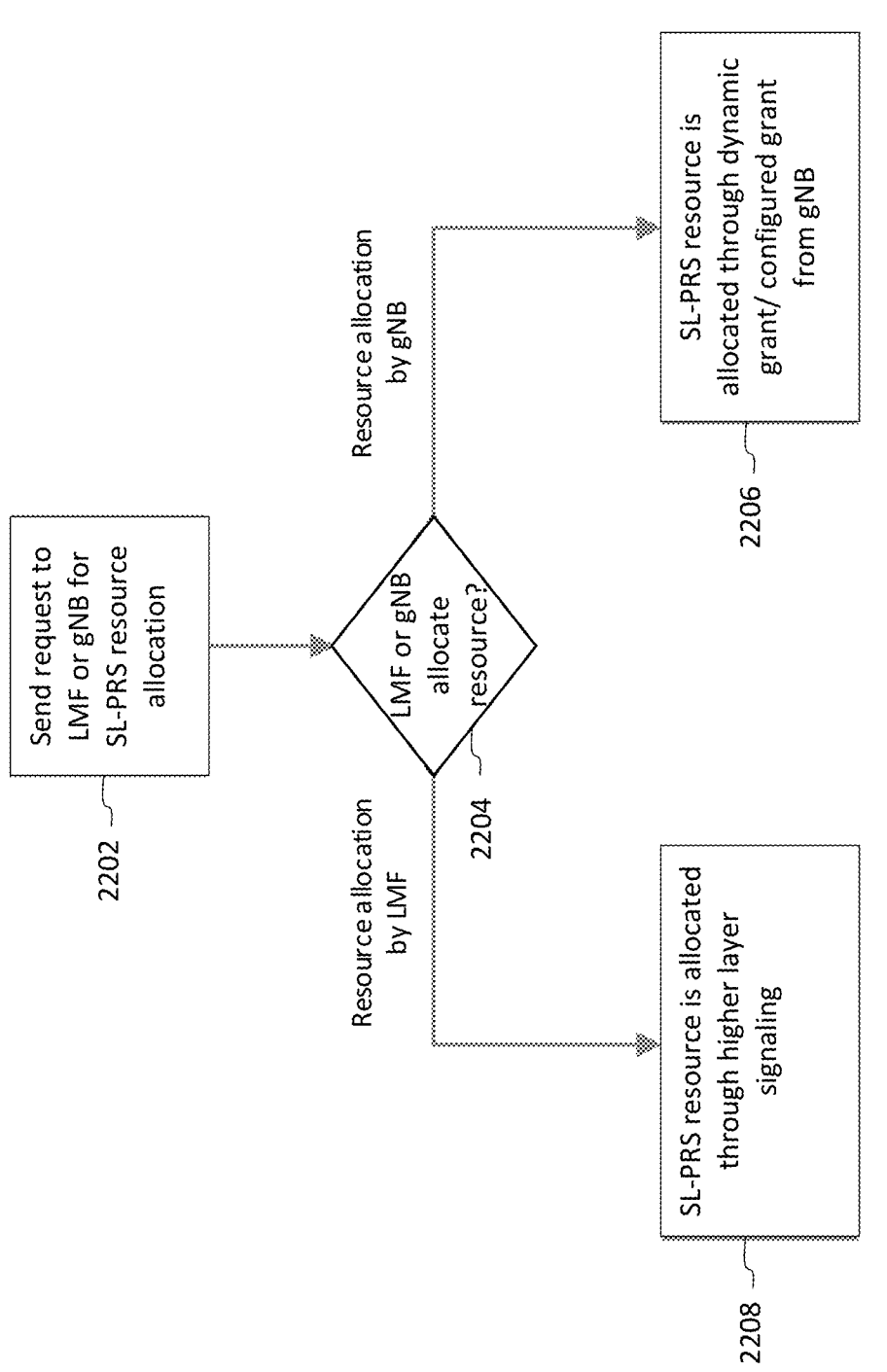
FIG. 22 is a diagram illustrating an SL-PRS resource allocation procedure in a first mode, according to an embodiment.

In the first mode, LMF/gNB controls the resource allocation for SL-PRS transmission. FIG. 22 is a diagram illustrating an SL-PRS resource allocation procedure in a first mode, according to an embodiment. Before transmitting SL-PRS, a UE (either anchor UE or target UE) may send a request to the LMF/gNB to ask for the resources for SL-PRS transmission, at 2202. After receiving the request of the UE, LMF/gNB determines whether to allocate resources for SL-PRS transmission by LMF or gNB, at 2204. When allocating the resources by gNB, the signaling for SL-PRS resource allocation can be carried by a dynamic grant or configured grant type 1/type 2 from gNB, at 2206. When allocating the resources by LMF, the signaling for SL-PRS resource allocation can be carried by LTE positioning protocol (LPP) directly from LMF, at 2208.

In the second mode, the SL-PRS resource selection is performed by the UE, i.e., either the anchor UE or the target UE can perform the resource selection based on sensing or random selection. Specifically, the procedure for sensing in Rel-16 SL communication may be used, as set forth below.

Figure 23:
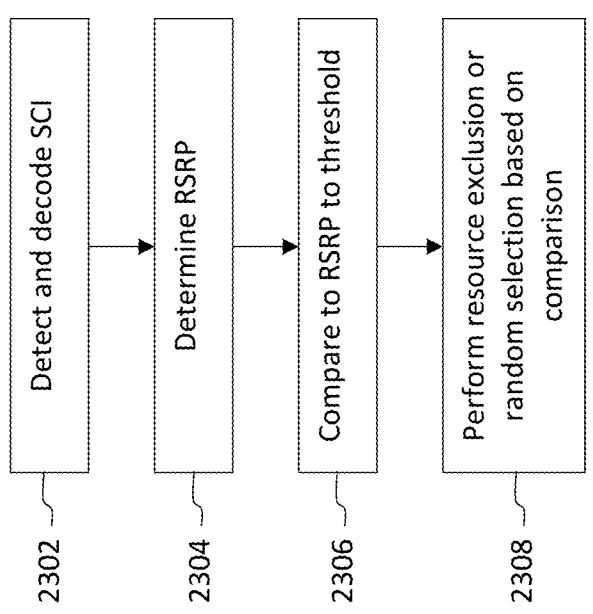
FIG. 23 is a diagram illustrating an SL-PRS resource allocation procedure in a second mode, according to an embodiment

FIG. 23 is a diagram illustrating an SL-PRS resource allocation procedure in a second mode, according to an embodiment. The sensing UE (e.g., the anchor UE) detects and decodes the second UE's SCI to obtain the reservation period and priority, at 2302. The sensing UE determines the RSRP based on the SCI and/or the measurement of the SL-PRS according to a configuration, at 2304. The sensing UE compares the RSRP to the RSRP threshold configured by the higher layer, at 2306. The sensing UE either performs the resource exclusion based on sensing results or performs random selection on the resource from the resource selection window, at 2308.

In NR Rel-16/Rel-17, congestion control may be applied to reduce the chances of collisions between neighboring device transmissions when the system is highly occupied. In particular, CBR and CR may be configured for congestion control.

Figure 24:
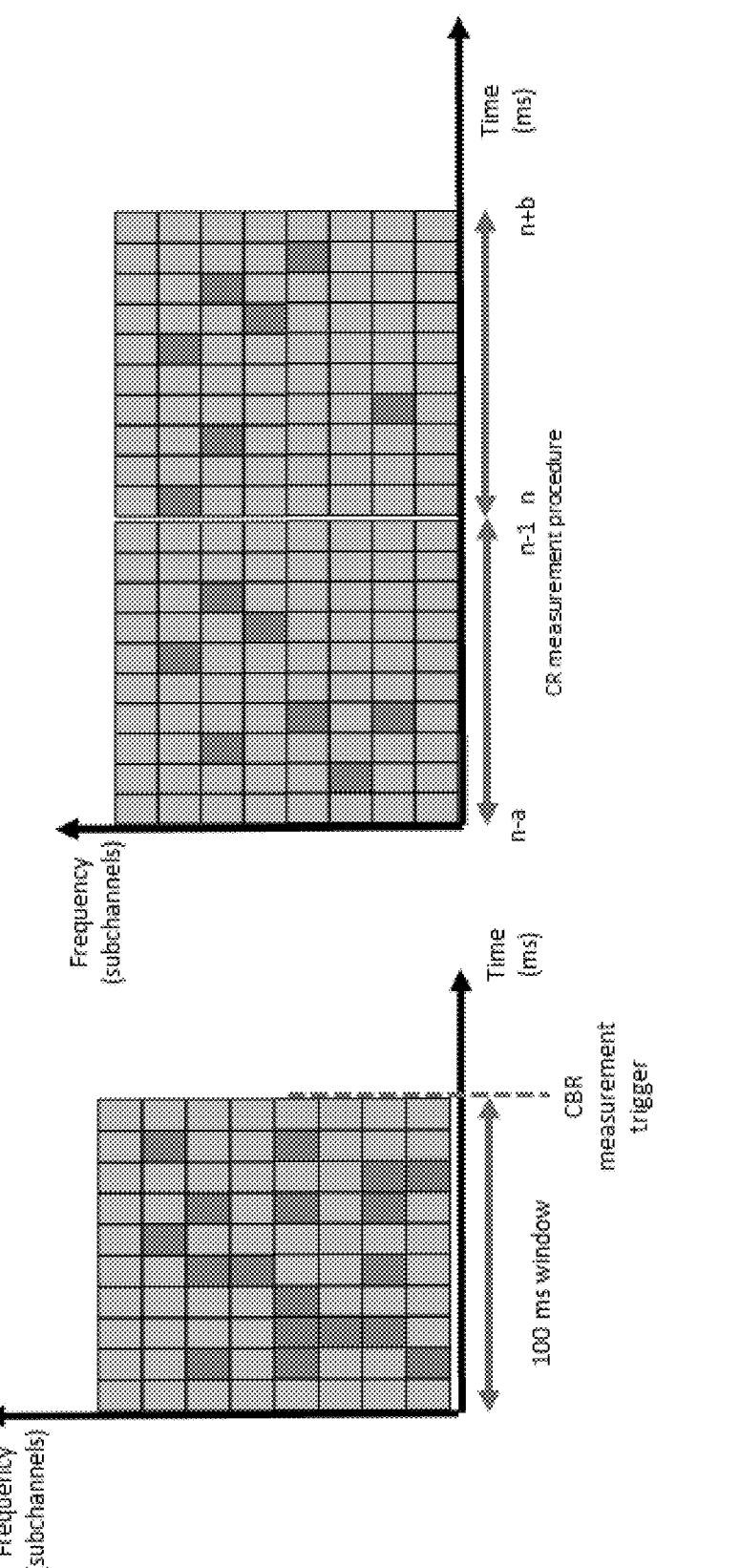
FIG. 24 is a diagram illustrating CBR and channel occupancy ratio (CR) measurements, according to an embodiment.

FIG. 24 is a diagram illustrating CBR and CR measurements, according to an embodiment. For a given past duration (typically 100 milliseconds (ms)), CBR is the ratio between the number of subchannel resources with a measured received signal strength indicator (RSSI) above a threshold and the total number of subchannels within the same duration. For a given past duration and a future duration, CR is the total number of subchannels used in the past duration and granted for the future duration to the total number of subchannels within the same duration.

When performing SL positioning, the SL-PRS should be transmitted across the complete bandwidth to have a better estimate of the UEs location. In this case, the UE's transmission can be staggered in the time domain with a comb structure to allow for the multiplexing of multiple UE transmissions. In particular, as shown in FIG. 2, when using a comb-2, the SL-PRS(s) are staggered over two OFDM symbols to allow the multiplexing of 2 UE transmissions within a slot. Hence, when a UE performs a SL-PRS transmission, especially in a dedicated resource pool, it will occupy all the available subchannels to enhance the quality of the location estimation. This will render the CBR measurements of NR Rel-16/Rel-17 obsolete since the measured RSSI in all the subchannels in a slot will be higher than a threshold even if there exists only one UE transmitting in this slot.

To address this drawback, the CBR/CR metric may be redefined such that it is measured based on the pre-configured SL-PRS indices rather than subchannels. The CBR/CR metric may be measured only on the PSCCH portion of the channels (when PSCCH is transmitted in the dedicated resource pool).

In the first approach, the CBR metric may be defined as the total number of SL-PRS resource candidates with RSSI measured above a given threshold to the total number of SL-PRS resources within a given duration. This definition is extremely beneficial when a dedicated resource pool is used for SL-PRS transmissions. For example, it may be assumed that a dedicated resource pool is configured with a subcarrier spacing=15 kilohertz (KHz) and a comb-4 structure (i.e., N=4) and M=10. In this case, for a duration of 100 ms there are 400 possible candidates for SL-PRS transmissions (4 candidates per slot×100 slots). In such a case, when measuring the CBR for congestion control, the NR UE can measure the received RSSI over these 400 possible candidates to identify the ones that are occupied. Similarly, when measuring the CR, the UE will be required to consider the SL-PRS candidate location that it used in a past duration, and the ones granted for transmission in a future duration. Similarly, the CR metric can be defined based on SL-PRS candidates rather than subchannels. In particular, the CR can be defined as the total number of SL-PRS resource candidates occupied in a past duration and granted in a future duration over the total number of SL-PRS resource candidates for the same duration.

In the second approach, the CBR metric may be defined as the total number of PSCCH candidates with measured RSSI above a given threshold to the total number of PSCCH candidates within a given duration. If this approach is considered, the underlying assumption is that the PSCCH is not repeated by a UE for AGC training (e.g., FIG. 18). Similarly, the CR may be defined with respect to the PSCCH transmissions rather than subchannels. In particular, the CR may be defined as the total number of PSCCH resource candidates occupied in a past duration and granted in a future duration over the total number of PSCCH resource candidates for the same duration.

Figure 25:
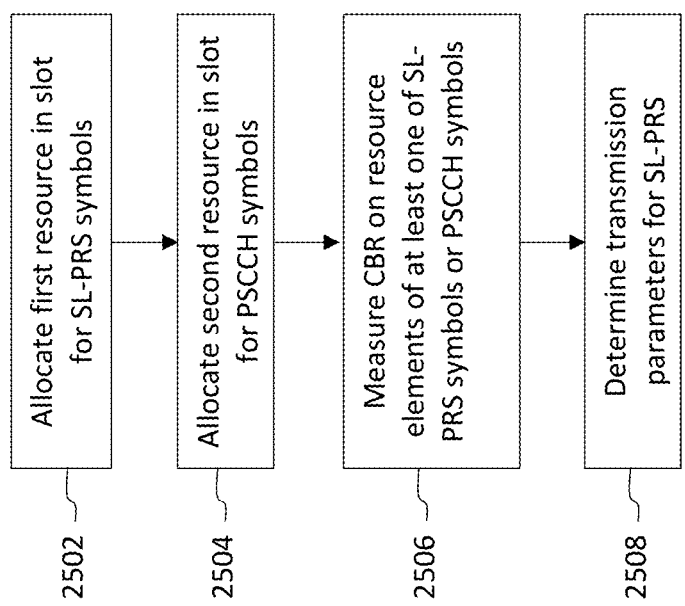
FIG. 25 is a flowchart illustrating a method for measuring a channel state in a slot, according to an embodiment.

FIG. 25 is a flowchart illustrating a method for measuring a channel state in a slot, according to an embodiment. At 2502, a UE allocates, in a dedicated resource pool for transmitting an SL-PRS, a first resource in a slot for SL-PRS symbols. At 2504, the UE allocates, in the dedicated resource pool, a second resource in a control region of the slot for PSCCH symbols. At 2506, the UE measures, in the dedicated resource pool, a CBR on resource elements of at least one of the SL-PRS symbols or the PSCCH symbols. At 2508, the UE determines transmission parameters for the SL-PRS based on at least the CBR. The UE may transmit the SL-PRS and associated control signaling in a PSCCH portion within the slot of the dedicated resource pool.

The CBR calculated as a ratio of a number of SL-PRS REs having an RSSI above a threshold within a duration to a total number of SL-PRS REs within the duration. The channel state may be the CBR calculated as a ratio of a number of PSCCH REs having an RSSI above a threshold within the duration to a total number of PSCCH REs within the duration. The channel state may be the CBR calculated using resource elements having an RSSI above a threshold in symbols having both SL-PRS and PSCCH resource elements. A number of SL-PRS transmissions may be determined by a transmission priority and the CBR. The CBR may be continuously measured on at least one SL-PRS symbol or at least one PSCCH symbol before triggering resource allocation. The duration may be configured or pre-configured per resource pool.

The UE may calculate a CR as a ratio of a number of SL-PRS REs that are occupied in a previous duration and granted in a current duration to a total number of SL-PRS REs in the previous and current durations. The channel state may be a CR calculated as a ratio of a number of PSCCH REs that are occupied in the previous duration and grated in the current duration to a total number of PSCCH REs in the previous and current durations. A transmission may be allowed if the CR is below a configured or pre-configured threshold. The previous and current durations may be configured or pre-configured per resource pool. The threshold may be based on a priority and may be configured or pre-configured per resource pool.

The UE may assume that slots in which CBR is not measured due to UE transmission include a number of SL-PRS or PSCCH resource elements with an RSSI above a threshold.

If an NR UE ends up transmitting in a given slot, it may not be able to receive any SL-PRS or PSCCH transmissions in this slot due to the half-duplex constraint. In this case, when performing the CBR calculations, all the resources of this slot may be considered to be occupied by neighboring UEs. In particular, if first CBR approach is considered, then the NR UE should assume that all the SL-PRS resources within the non-measured slot were occupied with neighboring SL-PRs transmissions with RSSI above a threshold. Similarly, for the $2^{nd}$ CBR approach discussed hereinabove, then the NR UE should assume that all the PSCCH resources within the non-measured slot were occupied with neighboring SL-PRs transmissions with RSSI above a threshold.

In NR Rel-17, two resource selection schemes were introduced to help reduce the chances of collisions between resource selection of neighboring UEs. These schemes were mainly aimed at resolving collisions due to the hidden node problem, the half-duplex constraint, and periodic transmissions (i.e., consistent collisions).

FIG. 26 is a diagram illustrating first and second resource selection assistance schemes, according to an embodiment.

A first scheme is provided in which an assisting UE 2602 performs sensing and accordingly provides a set of preferred or non-preferred resources to an assisted UE 2604 either by request or based on some triggering conditions. The assisted UE 2604 may then merge the resource selection assistance information received with its own sensing information when performing resource selection, or it can totally rely on the received assistance information if no sensing information is available.

A second scheme is provided in which the assisting UE 2602 performs sensing and accordingly provides a conflict indication once a collision is identified. In particular, once a collision is identified between two neighboring UEs (UE 2604 and UE 2606), the assisting UE 2602 provides a conflict indication to one of the UEs (UE 2604) to trigger a resource reselection and accordingly avoid the collisions with a transmission from neighboring UE 2606. The assisted UE 2604 is selected based on its capability (i.e., whether it supports resource selection assistance or not) as well as its priority.

Despite the advantages of these approaches in resolving collisions between neighboring UEs, they are not readily applicable to SL-PRS. In particular, in case of the first scheme, the resource selection assistance information is represented in a subchannel/slot format but does not consider the SL-PRS resources. Similarly, when providing the conflict indication, the assisting UE should be able to specify the SL-PRS resource over which the conflict has occurred. The two schemes may be updated to be applicable in a SL-PRS resource pool.

When the first resource selection assistance scheme is considered in a SL-PRS dedicated resource pool, an NR UE should be able to signal to the assisted UE the SL-PRS index that is either recommended by the assisted UE (i.e., the preferred resource) or the SL-PRS index that would result in a collision and thus should be avoided (i.e., the non-preferred resource). One way to achieve this goal is to reuse the FRIV field that was previously used to indicate the subchannel. In particular, when providing the assistance information (i.e., the preferred or non-preferred resource set), two approaches may be considered.

In a first approach, the assisting NR UE may indicate the slot and the SL-PRS indices that are either preferred on non-preferred. Subsequently, at the assisted UE side, the NR UE may either prioritize this resource when performing its resource selection for its PRS transmission in case of a preferred resource set, or exclude these resources when performing the resource selection in case of a non-preferred resource set. This first approach is beneficial when there is no control information sent in the dedicated resource pool (i.e., there is no PSCCH) and only SL-PRS is sent. This is because the UE will not be required to perform a resource selection for the PSCCH transmission. Furthermore, this first approach is also applicable if there exists a 1-to-1 mapping between the PSCCH transmission location (i.e., the subchannel over which the PSCCH is transmitted) and the selected SL-PRS index. This is because a collision will occur on the PSCCH only if there is also a collision on the SL-PRS which can be avoided by relying on the received assistance information.

In a second approach, the assisting NR UE may indicate the slot, the subchannel for the PSCCH transmission, and the SL-PRS the SL-PRS indices that are either preferred on non-preferred. Subsequently, the assisted UE may separately avoid collisions on the PSCCH and the SL-PRS resources by relying on the received preferred or non-preferred resource sets. This approach is beneficial when the PSCCH is transmitted in the dedicated resource pool and there exists no 1-to-1 mapping between the PSCCH transmission location and the SL-PRS index.

The selected assistance information (i.e., the preferred or the non-preferred resource set), can be indicated to the assisted UE by using either the $1^{st}$ or $2^{nd}$ stage SCI or as a medium access control (MAC) control element (CE) that is carried in a previous TB. In this case, two approaches can be considered depending on whether the assistance information is carried in the dedicated resource pool or in a regular resource pool (i.e., cross carrier scheduling).

A first approach includes signaling within the dedicated resource pool. When the PSCCH is transmitted along with the SL-PRS in the dedicated resource pool, the $1^{st}$ stage SCI can be used to carry the resource selection information. This may be done by either reusing the frequency resource indicator value (FRIV) field in the $1^{st}$ stage SCI to indicate the SL-PRS index or the SL-PRS index and the PSCCH location in cases wherein there exists a 1-to-1 mapping between the SL-PRS index and the PSCCH location. Alternatively, an additional field may be added to the PSCCH to separately indicate the SL-PRS index. Similarly, if the $2^{nd}$ stage SCI or a TB are transmitted in the dedicated resource pool (FIG. 17), the $2^{nd}$ stage SCI or a MAC CE may be used to carry the resource selection assistance information (i.e., the preferred/non-preferred resource sets). These sets may either use the time resource indicator value (TRIV) and FRIV fields to indicate only the SL-PRS index and the slot information when there exists a 1-to-1 mapping between the PSCCH location and the SL-PRS index, or use the TRIV, FRIV, and an additional new field to indicate the slot information, the SL-PRS index and the subchannel information.

A second approach includes signaling across resource pools. In this case, the preferred or non-preferred resource sets may be transmitted in a regular resource pool to provide assistance to UEs when selecting a resource in a dedicated resource pool. In other words, a cross-resource-pools approach is considered, where the assistance information for transmissions in a dedicated resource pool are transmitted in a normal resource pool. In this case, an additional 1-bit field may be added to indicate whether the assistance information is provided for the dedicated or the regular resource pools. In addition, the assistance information may be either carried in the $1^{st}$ or $2^{nd}$ stage SCI or as a MAC CE. In cases in which the $1^{st}$ or $2^{nd}$ stage SCI is used to carry the assistance information, either the TRIV and FRIV fields may be used to indicate only the SL-PRS index and the slot information when there exists a 1-to-1 mapping between the PSCCH location and the SL-PRS index or the TRIV, the FRIV, and an additional new field may be used to indicate the slot information, the SL-PRS index and the subchannel information.

When the second resource selection assistance scheme is considered to provide a conflict indication on a future SL-PRS index in a SL-PRS dedicated resource pool, the assisting UE should be capable of providing the exact indication of the conflicting SL-PRS index. In particular, there should exist a one-to-one mapping between each SL-PRS index on each slot and a corresponding PSFCH resource. In particular, multiple PSFCH resources may be used to specify the conflicting SL-PRS index. In particular, for a given slot, and if there exists four SL-PRS indices per slot, then there should exists four PSFCH sequences to indicate the exact SL-PRS resource that is conflicting. This is to have better resource utilization efficiency in the sense that a UE can specify the exact SL-PRS index that is of conflict rather than indicating a conflict on all the SL-PRS resources within a slot. Note that here the assumption is that there exists a one-to-one mapping between a SL-PRS index and a PSCCH location and, thus, a presence of a conflict in the PSCCH will be reflected in a conflict in a SL-PRS index. Alternatively, if there is no 1-to-1 mapping between the PSCCH location and the SL-PRS indices then additional PSFCH resources can be used to indicate the presence of a conflict on the PSCCH resource.

When providing the conflict indication to the assisted UE, the assisting UE can follow one of the following two approaches below.

A first approach includes conflict indication signaling within the dedicated resource pool. This first approach is beneficial when the PSFCH is transmitted in the dedicated resource pool. In this case, the PSFCH resources used to carry the conflict indication information would be present within the dedicated resource pool.

A second approach includes conflict indication signaling across resource pools. This approach is beneficial when the PSFCH is not transmitted in the dedicated resource pool. In this case, the PSFCH resources to carry the conflict indication information would be present in a regular resource pool. Subsequently, a subset of the PSFCH resources in the regular resource pool can be configured such that they are mapped to resource reservations in the dedicated resource pool. For example, the available resource selection assistance PSFCH resources can be split into two halves, wherein the first half is used to provide conflict indication for the regular resource pool and the other is mapped such that it provides a conflict indication for the dedicated resource pool.

In NR Rel-17, the PSFCH channel can be used to carry either ACK/NACK feedback or a conflict indication for the second resource selection assistance scheme. However, in some cases, it might be necessary to reuse the PSFCH resources for sending SL-PRS. In particular, to improve the accuracy of location estimation by the fast RTT SL positioning scheme, it is beneficial to have the Rx UE send its SL-PRS signals as soon as possible. To achieve this in case of a shared resource pool, one possibility is to send the SL-PRS resources in the PSFCH channel as shown in FIG. 27.

FIG. 27 is a diagram illustrating the transmission of SL-PRS in the PSFCH channel by one UE, according to an embodiment. Referring to FIG. 27, the slot begins with an AGC symbol 2702, followed by two PSCCH symbols 2704, seven PSSCH symbols 2706, and a gap symbol 2708. An AGC symbol 2718 and an SL-PRS symbol 2720 are transmitted in the PSFCH channel, and followed by a second gap symbol 2722.

However, in NR Rel-17, the selection of the PSFCH resources for the transmission of ACK/NACK or the transmission of resource selection assistance information may be partially based on a pre-configured mapping rule. Hence, a new field may be added to either the $1^{st}$ or $2^{nd}$ stage SCI or a new MAC CE to indicate the presence of SL-PRS transmissions. In particular, in the case of a non-contiguous transmission, since there is only one OFDM symbol within the PSFCH channel, there can exist only one SL-PRS transmission from one UE, since time staggering of SL-PRS signals over the PSFCH might not be possible (FIG. 26). This may be true in cases where there is a shared resource pool and there exists a PSSCH transmission by a different UE within the slot. In this case, only a one bit field will need to be added to the $1^{st}$ or $2^{nd}$ stage SCI or a new MAC CE to indicate whether the PSFCH resources can be used for SL-PRS or for providing ACK/NACK feedback. In this case, once the neighboring UEs detect the presence of this field they can identify the presence of SL-PRS transmission in the PSFCH resources and accordingly refrain from transmitting their ACK/NACK feedback (i.e., the SL-PRS transmission may always be prioritized over the ACK/NACK feedback).

Alternatively, priority-based RSRP thresholds may be configured to decide whether or not to transmit the ACK/NACK feedback. In particular, once a neighboring UE detects the presence of SL-PRS in the PSFCH channel (based on the decoded 1-bit field), it may measure the RSRP of the corresponding PSCCH that indicated the reservation and compare it against a threshold based on the priority of its PSFCH transmission. Subsequently, the neighboring UE may transmit its ACK/NACK feedback in the PSFCH channel only if the measured RSRP is below the pre-configured threshold. Since no time-multiplexing will be allowed for PRS signals in the PSFCH channel, neighboring NR UEs should not signal the presence of SL-PRS once they detect that a neighboring UE has already reserved the resource for its SL-PRS transmission. In other words, the UE that was first to indicate the presence of SL-PRS in the PSFCH channel will be the one allowed to transmit its SL-PRS signal. Alternatively, a neighboring NR UE may be allowed to transmit its SL-PRS signal in the PSFCH, if the two UEs are sufficiently separated. This may be determined based on the measured RSRP of the corresponding SCI being above a pre-configured threshold. In this case, if the measured RSRP is above a threshold then the UE will not transmit its SL-PRS in the PSFCH channel.

Alternatively, the PRS may be transmitted by up to two UEs simultaneously by using a comb 2 structure and a staggered approach, as shown in FIG. 28.

FIG. 28 is a diagram illustrating a staggering of PRS signals from two UEs in the PSFCH channel, according to an embodiment. It is assumed that the UE that transmitted the PSSCH will continue the transmission in the PSFCH to send the PRS and, thus, there is no need for a gap symbol or an AGC training symbol, thereby allowing the staggering of SL-PRS of two UEs across the complete band. The slots begin with an AGC symbol 2802, followed by two PSCCH symbols 2804, seven PSSCH symbols 2806, and SL-PRS for UE 1 and UE 2 2824. A symbol 2826 before a last gap symbol 2808 may be left empty as an additional gap or can be occupied by a PRS repetition. In addition, even if a first UE occupies one subchannel (e.g., subchannel 1), its PRS can span the complete bandwidth with its time/frequency multiplexed up to one UE (i.e., up to two UEs may be staggered in the PSFCH).

Similar to the previous approach, a new field may need to be added to either the $1^{st}$ or $2^{nd}$ stage SCI or a new MAC CE to indicate the presence of SL-PRS transmissions. However, since the time staggering of SL-PRS signals over the PSFCH is possible (FIG. 27), this field should also indicate the SL-PRS index used by the UE (i.e., either the $1^{st}$ or $2^{nd}$ SL-PRS index since only two UEs can be staggered in time). In this case, a two bit field may need to be added to the $1^{st}$ or $2^{nd}$ stage SCI or a new MAC CE to indicate whether the PSFCH resources can be used either for SL-PRS (and in this case indicate the SL-PRS index) or for providing ACK/NACK feedback. Once the neighboring UEs detect the presence of this field they can identify the presence of SL-PRS transmission in the PSFCH resources and accordingly refrain from transmitting their ACK/NACK feedback (i.e., the SL-PRS transmission can be prioritized over the ACK/NACK feedback). Alternatively, priority-based RSRP thresholds may be configured to decide whether or not to transmit the ACK/NACK feedback. In particular, once a neighboring UE detects the presence of SL-PRS in the PSFCH channel (based on the decoded 2-bit field), it may measure the RSRP of the corresponding PSCCH that indicated the reservation and compare it against a threshold based on the priority of its PSFCH transmission. Subsequently, the neighboring UE may transmit its ACK/NACK feedback in the PSFCH channel only if the measured RSRP is below the pre-configured threshold. Since time-multiplexing may be allowed for PRS signals in the PSFCH channel, a neighboring NR UE may signal the presence of the SL-PRS after it detects that a neighboring UE has reserved a resource for its SL-PRS transmission (i.e., it may still use the other indices available for SL-PRS transmission within the PSFCH). In other words, the two UEs that were first to indicate the presence of SL-PRS in the PSFCH channel may be the ones allowed to transmit its SL-PRS signal. Alternatively, a neighboring NR UE may be allowed to transmit its SL-PRS signal in the PSFCH if it is sufficiently separated. This may be determined based on the measured RSRP of the corresponding SCI being above a pre-configured threshold. In this case, if the measured RSRP is above a threshold then the UE may not transmit its SL-PRS in the PSFCH channel.

FIG. 29 is a block diagram of an electronic device in a network environment 2900, according to an embodiment.

Referring to FIG. 29, an electronic device 2901 in a network environment 2900 may communicate with an electronic device 2902 via a first network 2998 (e.g., a short-range wireless communication network), or an electronic device 2904 or a server 2908 via a second network 2999 (e.g., a long-range wireless communication network). The electronic device 2901 may communicate with the electronic device 2904 via the server 2908. The electronic device 2901 may include a processor 2920, a memory 2930, an input device 2950, a sound output device 2955, a display device 2960, an audio module 2970, a sensor module 2976, an interface 2977, a haptic module 2979, a camera module 2980, a power management module 2988, a battery 2989, a communication module 2990, a subscriber identification module (SIM) card 2996, or an antenna module 2997. In one embodiment, at least one (e.g., the display device 2960 or the camera module 2980) of the components may be omitted from the electronic device 2901, or one or more other components may be added to the electronic device 2901. Some of the components may be implemented as a single integrated circuit (IC). For example, the sensor module 2976 (e.g., a fingerprint sensor, an iris sensor, or an illuminance sensor) may be embedded in the display device 2960 (e.g., a display).

The processor 2920 may execute software (e.g., a program 2940) to control at least one other component (e.g., a hardware or a software component) of the electronic device 2901 coupled with the processor 2920 and may perform various data processing or computations.

As at least part of the data processing or computations, the processor 2920 may load a command or data received from another component (e.g., the sensor module 2976 or the communication module 2990) in volatile memory 2932, process the command or the data stored in the volatile memory 2932, and store resulting data in non-volatile memory 2934. The processor 2920 may include a main processor 2921 (e.g., a central processing unit (CPU) or an application processor (AP)), and an auxiliary processor 2923 (e.g., a graphics processing unit (GPU), an image signal processor (ISP), a sensor hub processor, or a communication processor (CP)) that is operable independently from, or in conjunction with, the main processor 2921. Additionally or alternatively, the auxiliary processor 2923 may be adapted to consume less power than the main processor 2921, or execute a particular function. The auxiliary processor 2923 may be implemented as being separate from, or a part of, the main processor 2921.

The auxiliary processor 2923 may control at least some of the functions or states related to at least one component (e.g., the display device 2960, the sensor module 2976, or the communication module 2990) among the components of the electronic device 2901, instead of the main processor 2921 while the main processor 2921 is in an inactive (e.g., sleep) state, or together with the main processor 2921 while the main processor 2921 is in an active state (e.g., executing an application). The auxiliary processor 2923 (e.g., an image signal processor or a communication processor) may be implemented as part of another component (e.g., the camera module 2980 or the communication module 2990) functionally related to the auxiliary processor 2923.

The memory 2930 may store various data used by at least one component (e.g., the processor 2920 or the sensor module 2976) of the electronic device 2901. The various data may include, for example, software (e.g., the program 2940) and input data or output data for a command related thereto. The memory 2930 may include the volatile memory 2932 or the non-volatile memory 2934. Non-volatile memory 2934 may include internal memory 2936 and/or external memory 2938.

The program 2940 may be stored in the memory 2930 as software, and may include, for example, an operating system (OS) 2942, middleware 2944, or an application 2946.

The input device 2950 may receive a command or data to be used by another component (e.g., the processor 2920) of the electronic device 2901, from the outside (e.g., a user) of the electronic device 2901. The input device 2950 may include, for example, a microphone, a mouse, or a keyboard.

The sound output device 2955 may output sound signals to the outside of the electronic device 2901. The sound output device 2955 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 2960 may visually provide information to the outside (e.g., a user) of the electronic device 2901. The display device 2960 may include, for example, a display, a hologram device, or a projector and control circuitry to control a corresponding one of the display, hologram device, and projector. The display device 2960 may include touch circuitry adapted to detect a touch, or sensor circuitry (e.g., a pressure sensor) adapted to measure the intensity of force incurred by the touch.

The audio module 2970 may convert a sound into an electrical signal and vice versa. The audio module 2970 may obtain the sound via the input device 2950 or output the sound via the sound output device 2955 or a headphone of an external electronic device 2902 directly (e.g., wired) or wirelessly coupled with the electronic device 2901.

The sensor module 2976 may detect an operational state (e.g., power or temperature) of the electronic device 2901 or an environmental state (e.g., a state of a user) external to the electronic device 2901, and then generate an electrical signal or data value corresponding to the detected state. The sensor module 2976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2977 may support one or more specified protocols to be used for the electronic device 2901 to be coupled with the external electronic device 2902 directly (e.g., wired) or wirelessly. The interface 2977 may include, for example, a high-definition multimedia interface (HDMI), a universal serial bus (USB) interface, a secure digital (SD) card interface, or an audio interface.

A connecting terminal 2978 may include a connector via which the electronic device 2901 may be physically connected with the external electronic device 2902. The connecting terminal 2978 may include, for example, an HDMI connector, a USB connector, an SD card connector, or an audio connector (e.g., a headphone connector).

The haptic module 2979 may convert an electrical signal into a mechanical stimulus (e.g., a vibration or a movement) or an electrical stimulus which may be recognized by a user via tactile sensation or kinesthetic sensation. The haptic module 2979 may include, for example, a motor, a piezo-electric element, or an electrical stimulator.

The camera module 2980 may capture a still image or moving images. The camera module 2980 may include one or more lenses, image sensors, image signal processors, or flashes. The power management module 2988 may manage power supplied to the electronic device 2901. The power management module 2988 may be implemented as at least part of, for example, a power management integrated circuit (PMIC).

The battery 2989 may supply power to at least one component of the electronic device 2901. The battery 2989 may include, for example, a primary cell which is not rechargeable, a secondary cell which is rechargeable, or a fuel cell.

The communication module 2990 may support establishing a direct (e.g., wired) communication channel or a wireless communication channel between the electronic device 2901 and the external electronic device (e.g., the electronic device 2902, the electronic device 2904, or the server 2908) and performing communication via the established communication channel. The communication module 2990 may include one or more communication processors that are operable independently from the processor 2920 (e.g., the AP) and supports a direct (e.g., wired) communication or a wireless communication. The communication module 2990 may include a wireless communication module 2992 (e.g., a cellular communication module, a short-range wireless communication module, or a global navigation satellite system (GNSS) communication module) or a wired communication module 2994 (e.g., a local area network (LAN) communication module or a power line communication (PLC) module). A corresponding one of these communication modules may communicate with the external electronic device via the first network 2998 (e.g., a short-range communication network, such as BLUETOOTH™, wireless-fidelity (Wi-Fi) direct, or a standard of the Infrared Data Association (IrDA)) or the second network 2999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 2992 may identify and authenticate the electronic device 2901 in a communication network, such as the first network 2998 or the second network 2999, using subscriber information (e.g., international mobile subscriber identity (IMSI)) stored in the subscriber identification module 2996.

The antenna module 2997 may transmit or receive a signal or power to or from the outside (e.g., the external electronic device) of the electronic device 2901. The antenna module 2997 may include one or more antennas, and, therefrom, at least one antenna appropriate for a communication scheme used in the communication network, such as the first network 2998 or the second network 2999, may be selected, for example, by the communication module 2990 (e.g., the wireless communication module 2992). The signal or the power may then be transmitted or received between the communication module 2990 and the external electronic device via the selected at least one antenna.

Commands or data may be transmitted or received between the electronic device 2901 and the external electronic device 2904 via the server 2908 coupled with the second network 2999. Each of the electronic devices 2902 and 2904 may be a device of a same type as, or a different type, from the electronic device 2901. All or some of operations to be executed at the electronic device 2901 may be executed at one or more of the external electronic devices 2902, 2904, or 2908. For example, if the electronic device

2901 should perform a function or a service automatically, or in response to a request from a user or another device, the electronic device 2901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 2901. The electronic device 2901 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:

allocating, by a user equipment (UE), in a dedicated resource pool for transmitting a sidelink (SL)-positioning reference signal (PRS), a first resource in a slot for SL-PRS symbols;

allocating, by the UE, in the dedicated resource pool, a second resource in a control region of the slot for physical SL control channel (PSCCH) symbols;

measuring, by the UE, in the dedicated resource pool, a channel busy ratio (CBR) based on resource elements of at least one of the SL-PRS symbols or the PSCCH symbols; and determining transmission parameters for the SL-PRS based on at least the CBR.

2. The method of claim 1, further comprising transmitting, by the UE, the SL-PRS in the first resource and associated control signaling in the second resource within the slot of the dedicated resource pool.

3. The method of claim 1, wherein the CBR is calculated as:

a first ratio of a number of SL-PRS resource elements having a received signal strength indicator (RSSI) above a threshold within a duration to a total number of SL-PRS resource elements within the duration;

a second ratio of a number of PSCCH resource elements having an RSSI above a threshold within the duration to a total number of PSCCH resource elements within the duration; or a third ratio of a number of resource elements having an RSSI above a threshold in symbols having both SL-PRS and PSCCH resource elements within the duration to a total number of resource elements within the duration.

4. The method of claim 3, wherein a number of SL-PRS transmissions is determined by a transmission priority and the CBR.

5. The method of claim 3, wherein the CBR is continuously measured on at least one candidate SL-PRS symbol or at least one candidate PSCCH symbol before triggering resource allocation.

6. The method of claim 3, wherein the duration is configured or pre-configured per resource pool.

7. The method of claim 1, further comprising calculating a channel occupancy ratio (CR) as:

a first ratio of a number of SL-PRS resource elements that are occupied in a previous allocation period and granted in a current allocation period to a total number of SL-PRS resource elements in the previous and current durations; or a second ratio of a number of PSCCH resource elements that are occupied in the previous allocation period and granted in the current allocation period to a total number of PSCCH resource elements in the previous and current durations.

8. The method of claim 7, wherein:

a transmission of the SL-PRS is allowed if the CR is below a configured or pre-configured threshold.

9. The method of claim 8, wherein the threshold is based on a priority and is configured or pre-configured per resource pool.

10. The method of claim 1, wherein the UE assumes that slots in which CBR is not measured due to transmission comprise a number of SL-PRS or PSCCH resource elements with an RSSI above a threshold.

11. A user equipment (UE) comprising:

a processor; and a non-transitory computer readable storage medium storing instructions that, when executed, cause the processor to:

allocate, in a dedicated resource pool for transmitting a sidelink (SL)-positioning reference signal (PRS), a first resource in a slot for SL-PRS symbols;

allocate, in the dedicated resource pool, a second resource in a control region of the slot for physical SL control channel (PSCCH) symbols;

measure, in the dedicated resource pool, a channel busy ratio (CBR) based on resource elements of at least one of the SL-PRS symbols or the PSCCH symbols; and determine transmission parameters for the SL-PRS based on at least the CBR.

12. The UE of claim 11, wherein the instructions further cause the processor to transmit the SL-PRS in the first resource and associated control signaling in the second resource within the slot of the dedicated resource pool.

13. The UE of claim 11, wherein the CBR is calculated as:

a first ratio of a number of SL-PRS resource elements having a received signal strength indicator (RSSI) above a threshold within a duration to a total number of SL-PRS resource elements within the duration;

a second ratio of a number of PSCCH resource elements having an RSSI above a threshold within the duration to a total number of PSCCH resource elements within the duration; or a third ratio of a number of resource elements having an RSSI above a threshold in symbols having both SL-PRS and PSCCH resource elements within the duration to a total number of resource elements within the duration.

14. The UE of claim 13, wherein a number of SL-PRS transmissions is determined by a transmission priority and the CBR.

15. The UE of claim 13, wherein the CBR is continuously measured on at least one candidate SL-PRS symbol or at least one candidate PSCCH symbol before triggering resource allocation.

16. The UE of claim 13, wherein the duration is configured or pre-configured per resource pool.

17. The UE of claim 11, wherein the instructions further cause the processor to calculate a channel occupancy ratio (CR) as:

a first ratio of a number of SL-PRS resource elements that are occupied in a previous allocation period and granted in a current allocation period to a total number of SL-PRS resource elements in the previous and current durations; or a second ratio of a number of PSCCH resource elements that are occupied in the previous allocation period and granted in the current allocation period to a total number of PSCCH resource elements in the previous and current durations.

18. The UE of claim 17, wherein:

a transmission of the SL-PRS is allowed if the CR is below a configured or pre-configured threshold.

19. The UE of claim 18, wherein the threshold is based on a priority and is configured or pre-configured per resource pool.

20. The UE of claim 11, wherein the UE assumes that slots in which CBR is not measured due to transmission comprise a number of SL-PRS or PSCCH resource elements with an RSSI above a threshold.

* * * * *